US009374796B2

(12) United States Patent
Li et al.

(10) Patent No.: US 9,374,796 B2
(45) Date of Patent: Jun. 21, 2016

(54) CHANNEL STRUCTURE FOR A CELLULAR INTERNET OF THINGS SYSTEM

(71) Applicant: QUALCOMM Incorporated, San Diego, CA (US)

(72) Inventors: Junyi Li, Chester, NJ (US); Frank Anton Lane, Easton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 14/511,173

(22) Filed: Oct. 10, 2014

(65) Prior Publication Data
US 2016/0105860 A1     Apr. 14, 2016

(51) Int. Cl.
*H04B 7/212*     (2006.01)
*H04W 56/00*     (2009.01)
(Continued)

(52) U.S. Cl.
CPC ............ *H04W 56/005* (2013.01); *H04W 4/005* (2013.01); *H04W 72/005* (2013.01); *H04W 72/044* (2013.01); *H04W 72/0406* (2013.01); *H04W 74/0833* (2013.01)

(58) Field of Classification Search
CPC ............ H04W 56/005; H04W 72/005; H04W 74/0833; H04W 72/0406; H04W 72/044; H04W 4/005; H04W 56/00; H04W 56/0045; H04B 7/2041; H04B 7/18589; H04B 7/2662; H04L 2012/5608
USPC .......................................... 370/324, 350, 503
See application file for complete search history.

(56) References Cited

U.S. PATENT DOCUMENTS

| 7,983,702 | B2 * | 7/2011 | Li ........................ H04W 56/002 370/252 |
| 8,233,428 | B2 * | 7/2012 | Ernstrom .............. H04W 56/00 370/324 |

(Continued)

FOREIGN PATENT DOCUMENTS

EP     2615765 A2     7/2013
EP     2945419 A1     11/2015
(Continued)

OTHER PUBLICATIONS

Lo et al., "Enhanced LTE-Advanced Random-Access Mechanism for Massive Machine-to-Machine (M2M) Communications," 27th World Wireless Research Forum Meeting (WWRF-WG4-08), 2011, pp. 1-7, downloaded from http://www.wsnlabs.com/pub/lo11enhanced.pdf.

(Continued)

*Primary Examiner* — Brenda H Pham
(74) *Attorney, Agent, or Firm* — Holland & Hart LLP

(57) ABSTRACT

Methods, systems, and devices are described for wireless communication at a user equipment (UE). A UE may synchronize with a cell using a waveform known to the UE beforehand, and common to a group of cells. The UE may determine a physical broadcast channel (PBCH) time. The UE may receive the PBCH and determine a physical layer identification (ID) for the cell and a frequency for uplink transmissions. The PBCH may also indicate a channel configuration, which may enable the UE to perform a random access procedure. The channel configuration may include a time/frequency resource configuration of a shared traffic channel. In some cases, the UE may determine resources for data transmission based on an index of a control channel transmission. In some cases, there may be a predetermined delay between control channel transmissions and data channel transmissions. The UE may then enter a low power state during the delay.

30 Claims, 16 Drawing Sheets

(51) Int. Cl.
  *H04W 72/00* (2009.01)
  *H04W 74/08* (2009.01)
  *H04W 72/04* (2009.01)
  *H04W 4/00* (2009.01)

(56) References Cited

U.S. PATENT DOCUMENTS

| | | |
|---|---|---|
| 2010/0182903 A1 | 7/2010 | Palanki et al. |
| 2013/0077582 A1* | 3/2013 | Kim .................... H04W 74/006 370/329 |
| 2013/0163569 A1* | 6/2013 | Lee ....................... H04L 1/0045 370/336 |
| 2013/0265984 A1 | 10/2013 | Li et al. |
| 2014/0105164 A1 | 4/2014 | Moulsley et al. |
| 2014/0161063 A1 | 6/2014 | Yeh, II et al. |
| 2015/0103800 A1 | 4/2015 | Seo et al. |

FOREIGN PATENT DOCUMENTS

| | | |
|---|---|---|
| WO | WO-2013125873 A1 | 8/2013 |
| WO | WO-2014069946 A1 | 5/2014 |
| WO | WO-2014109566 A1 | 7/2014 |

OTHER PUBLICATIONS

ISA/EPO, International Search Report and the Written Opinion of the International Searching Authority, Int'l. App. No. PCT/US2015/051158, Dec. 8, 2015, European Patent Office, Rijswijk, NL 11 pgs.

* cited by examiner

CHANNEL STRUCTURE FOR A CELLULAR INTERNET OF THINGS SYSTEM

BACKGROUND

1. Field of Disclosure

The following relates generally to wireless communication, and more specifically to a channel structure for a cellular internet of things (IoT) system.

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

Some UEs may provide for automated communication. Automated UEs may include those implementing Machine-to-Machine (M2M) communication or Machine Type Communication (MTC). M2M or MTC may refer to data communication technologies that allow devices to communicate with one another or a base station without human intervention. M2M or MTC devices may include UEs and may be used as part of an Internet of Things (IoT). Some M2M or MTC devices in an IoT may include parking meters, water and gas meters, and other sensors that may infrequently communicate small amounts of data.

In some cases, including in an IoT, a UE may be a power limited device designed for low throughput or infrequent data transfers. In some cases a UE may not be configured to transmit and receive simultaneously. A wireless system designed to serve devices with a large battery capacity and high throughput may not be appropriate for such devices. Similarly, a wireless system based on simultaneous uplink and downlink communication may preclude these devices from effectively communicating over the network. However, rebuilding network components such as base stations may be cost prohibitive.

SUMMARY

The present disclosure may relate generally to wireless communications systems, and more particularly to improved systems, methods, and apparatuses for a channel structure for a cellular IoT system. A UE may synchronize with a cell using a waveform known to the UE beforehand, and common to a group of cells in the local region. The UE may then determine a physical broadcast channel (PBCH) time. The UE may receive the PBCH and use it to determine a physical layer identification (ID) for the cell and a frequency for uplink transmissions. The PBCH may also indicate a channel configuration, which may enable the UE to perform a random access procedure. The channel configuration may include a time and frequency resource configuration of a shared traffic channel. In some cases, the UE may determine resources for data transmission based on an index of a control channel transmission. In some cases, there may be a predetermined delay between control channel transmissions and data channel transmissions. The UE may then enter a low power state during the delay.

A method of wireless communication at a UE is described. The method may include receiving a first synchronization signal from a first cell on a common synchronization channel of the first cell, wherein the first synchronization signal is a waveform known to the UE prior to receiving the signal, estimating a symbol time of the first synchronization signal, determining a PBCH symbol time of the first cell based on the estimated symbol time of the first synchronization signal, receiving a PBCH signal based at least in part on the PBCH symbol time, and determining a physical layer ID of the first cell based on the received PBCH signal.

An apparatus for wireless communication at a UE is described. The apparatus may include means for receiving a first synchronization signal from a first cell on a common synchronization channel of the first cell, wherein the first synchronization signal is a waveform known to the UE prior to receiving the signal, means for estimating a symbol time of the first synchronization signal, means for determining a PBCH symbol time of the first cell based on the estimated symbol time of the first synchronization signal, means for receiving a PBCH signal based at least in part on the PBCH symbol time, and means for determining a physical layer ID of the first cell based on the received PBCH signal.

A further apparatus for wireless communication at a UE is described. The apparatus may include a processor, memory in electronic communication with the processor, and instructions stored in the memory, wherein the instructions are executable by the processor to receive a first synchronization signal from a first cell on a common synchronization channel of the first cell, wherein the first synchronization signal is a waveform known to the UE prior to receiving the signal, estimate a symbol time of the first synchronization signal, determine a PBCH symbol time of the first cell based on the estimated symbol time of the first synchronization signal, receive a PBCH signal based at least in part on the PBCH symbol time, and determine a physical layer ID of the first cell based on the received PBCH signal.

A non-transitory computer-readable medium storing code for wireless communication at a UE is described. The code may include instructions executable to receive a first synchronization signal from a first cell on a common synchronization channel of the first cell, wherein the first synchronization signal is a waveform known to the UE prior to receiving the signal, estimate a symbol time of the first synchronization signal, determine a PBCH symbol time of the first cell based on the estimated symbol time of the first synchronization signal, receive a PBCH signal based at least in part on the PBCH symbol time, and determine a physical layer ID of the first cell based on the received PBCH signal.

Some examples of the method, apparatuses, and/or non-transitory computer-readable medium described above may further include identifying a configuration message based on the PBCH signal, transmitting a random access signal to the first cell based on the received configuration message, establishing a first connection to the first cell, receiving a second synchronization signal from a second cell on a common synchronization channel of the second cell, the second cell being different from the first cell, wherein the first and second synchronization signals use the same waveform, establishing a second connection to the second cell based on the second synchronization signal, and exchanging data with the first or second cell based on a channel structure specified by the configuration message. Additionally or alternatively, in some examples the first cell and the second cell are elements of a set of cells sharing the known waveform, wherein each cell from the set of cells has an overlapping coverage area with another cell from the set of cells.

Some examples of the method, apparatuses, and/or non-transitory computer-readable medium described above may further include estimating a carrier frequency of the first synchronization signal, comparing the estimated carrier frequency of the first synchronization signal and a local carrier frequency generated by a local oscillator of the UE, generating an uplink carrier frequency as a function of the comparison, and transmitting an uplink signal with the generated uplink carrier frequency. Additionally or alternatively, in some examples the PBCH signal comprises a configuration message specifying a time and frequency resource configuration of a shared data traffic channel for transmitting payload data traffic, and receiving a control channel transmission that specifies an ID of the UE and an index of a time frequency resource for a data channel transmission on the shared data traffic channel.

Some examples of the method, apparatuses, and/or non-transitory computer-readable medium described above may further include receiving the data channel transmission on the time frequency resource of the shared data traffic channel. Additionally or alternatively, some examples may include transmitting the data channel transmission on the time frequency resource of the shared data traffic channel.

In some examples of the method, apparatuses, and/or non-transitory computer-readable medium described above, a transmission power of the control channel transmission is proportional to a transmission power of the data channel transmission. Additionally or alternatively, in some examples the transmission power of the control channel transmission is based on a path loss of the UE.

In some examples of the method, apparatuses, and/or non-transitory computer-readable medium described above, the control channel transmission comprises a delay between a timing of the control channel transmission and a timing of the data channel transmission, initiating a sleep wake up timer based on the timing of the data channel transmission, entering a power saving mode based at least in part on initiating the sleep wake up timer, and receiving the data channel transmission upon expiration of the sleep wake up timer. Additionally or alternatively, in some examples the control channel transmission comprises a delay between a timing of the control channel transmission and a timing of the data channel transmission, initiating a sleep wake up timer based on the timing of the data channel transmission, entering a power saving mode based at least in part on initiating the sleep wake up timer, and transmitting the data channel transmission upon expiration of the sleep wake up timer.

Some examples of the method, apparatuses, and/or non-transitory computer-readable medium described above may further include exchanging data using a set of channels with segments arranged according to a flexible time and frequency tiling pattern of a flexible channel structure. Additionally or alternatively, in some examples the flexible channel structure comprises a configuration of a shared channel tiling pattern based on a predetermined table and the configuration is specified by the configuration message transmitted in the PBCH signal.

In some examples of the method, apparatuses, and/or non-transitory computer-readable medium described above, an index of the time frequency resource indicates an index of the predetermined table. Additionally or alternatively, in some examples a length of the PBCH signal is fixed and known to the UE prior to receiving the PBCH signal.

Some examples of the method, apparatuses, and/or non-transitory computer-readable medium described above may further include exchanging data with a network based on machine type communication (MTC) procedures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
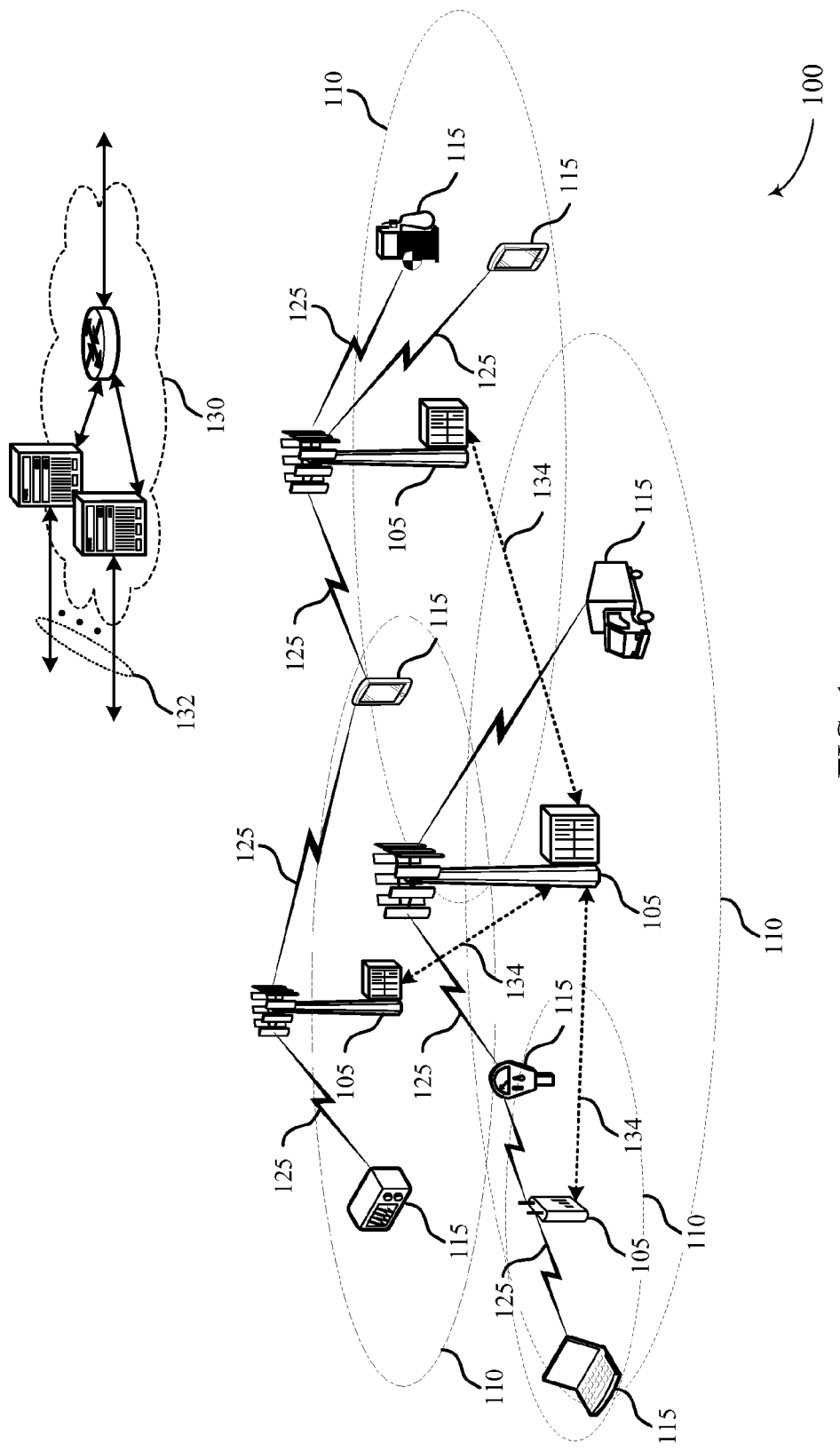
FIG. 1 illustrates an example of a wireless communications system for a channel structure for a cellular IoT system in accordance with various aspects of the present disclosure.

A network of automated devices which communicate wirelessly may, in some cases, be referred to as the internet of things (IoT). Devices which communicate over the IoT network (e.g., machine type communication (MTC) devices) may include automated meters, sensors, and the like. In some instances, the automated devices may have relatively low throughput applications (e.g., a water level sensor sending an update to a base station). There may be a number of wireless communication systems available for use by the automated devices, including cellular systems operating in licensed spectrum. However, cellular systems may be used for devices which use high through-put applications. Devices that operate according to low throughput conditions (e.g., infrequent and small data transfers) may present design considerations different from those associated with higher through-put devices. For example, an automated device may be designed to operate for long periods of time without battery replacement.

In some cellular systems, such as LTE, there may be a well-defined channel structure, but it may not be power efficient for an IoT device. Thus, it may be appropriate for an IoT device to operate according to a channel structure which compensates for IoT design considerations. For example, a channel structure may have fixed lengths for the physical common synchronization channel (PCSCH) and physical broadcast channel (PBCH) in every frame. Also, during initial acquisition, the PCSCH transmission may be a known waveform that is the same for all cells in a local group. Additionally, the PBCH, physical downlink control channel (PDCCH), physical downlink shared channel (PDSCH), and physical uplink shared channels (PUSCH) may be separated. In some cases, PDSCH/PUSCH may use flexible time/frequency tiling. For example, PDSCH/PUSCH segments may be sent at different times with the segments arranged in a time/frequency manner. In some embodiments, the configurations of all supported tiling PDSCH/PUSCH patterns may be given by a predetermined table.

The channel configuration may be dynamically updated, and in some instances PBCH may indicate a change to the channel configuration from one frame to another. For example, PBCH may comprise information specifying the time/frequency configuration of physical random access channel (PRACH), PDCCH, and PDSCH/PUSCH. PBCH may also convey an index of the present PDSCH/PUSCH configuration. Thus, the information conveyed by PBCH may indicate to a device the time/frequency configuration of the PDSCH segments, thereby allowing the device to decode PDCCH. Accordingly, PDCCH may specify the index of the PDSCH/PUSCH segment and the ID of the assigned automated device. A device may wake up at the beginning of a frame, decode the control message, and then become active when its PDSCH or PUSCH is assigned.

In some cases a base station may implement an activity time-out mechanism to move an active device to sleep. In some cases, a device may send a termination message, together with traffic, in an assigned PUSCH segment. In some cases, the DL and UL scheduling may be coordinated such that a device is not scheduled to transmit and receive at the same time to support frequency division duplex (FDD) half-duplex operation.

In some examples, different PDCCH and PDSCH segments may use different transmission power. For example, the transmission power of PDCCH may be scaled proportional to the transmission power of PDSCH (e.g., more power may be allocated to a faraway device than to a nearby device in both PDCCH and PDSCH).

In other cases, communication between an IoT device and a base station may be improved by using open loop timing synchronization to determine transmit symbol time. As a result, uplink signals from different IoT devices communicating with a same base station in the IoT network may arrive within a window of time, the length of which may be up to the maximum round-trip delay between the IoT devices and the base station. To account for this, the length of a cyclic prefix used in an uplink transmission by an IoT device may be extended, while the length of a cyclic prefix used in a downlink transmission to the IoT device may remain shorter than the extended uplink cyclic prefix.

In some examples, a device may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

In another example, a base station may allocate, to a device, time or frequency resources for transmitting physical random access channel (PRACH) signals. In such instance, the resource allocation may be apportioned based on a type and class of PRACH signal. For example, a UE may be assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at the device).

In some examples, a device may perform an initial access procedure to establish a connection with a serving cell. The device may then arrange a regular transmission schedule with the serving cell including a discontinuous transmission (DTX) cycle and an acknowledgement schedule. The device may enter a low power mode and refrain from any transmission during the a sleep interval of the DTX cycle. The device may then wake up and transmit a message to the serving cell after the sleep interval without performing an another access procedure. The device may perform another access procedure to transmit at times not covered by the regular transmission schedule. For example, if an acknowledgement (ACK) for the message isn't received, the device may perform another access procedure for retransmission.

In yet another example, an IoT device may use stored control information from a first communication session with the base station to determine the power and timing control information for a subsequent second communication session. Specifically, in this example, a device may establish a first communication session with the base station and receive, during the first communication session, closed loop control information from the base station to aid the device in adjusting transmit signal symbol timing or power control levels associated with an uplink transmission. In such instance, the device may store, in its memory, the transmit power and symbol timing information derived from the closed loop control information during the first communication session. Subsequently, the device may utilize the stored closed loop control information from the first communication session to determine the transmit signal power or symbol timing to establish a second communication session with the base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., 51, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

In the wireless communications system 100, some UEs may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. The UEs 115 in wireless communications system 100 that are M2M or MTC devices may also be part of an IoT. Thus, wireless communications system 100 may also include or be part of an IoT system.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in the central 6 resource blocks (RBs) (72 subcarriers) of a carrier. After receiving the PSS and SSS, the UE 115 may receive a master information block (MIB), which may be transmitted in the PBCH. The MIB may contain system bandwidth information, a system frame number (SFN), and a physical HARQ indicator channel (PHICH) configuration. After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, PUCCH, PUSCH, power control, SRS, and cell barring.

According to the present disclosure, a UE 115 may synchronize with a cell of a base station 105 using a waveform known to the UE 115 beforehand, and common to a group of base stations 105 in the local region. The UE 115 may then determine a PBCH time and may receive the PBCH and use it to determine a physical layer ID for the cell and a frequency for uplink transmissions. The PBCH may also indicate a channel configuration, which may enable the UE 115 to perform a RACH procedure. The channel configuration may include a time and frequency resource configuration of a shared traffic channel (e.g., PDSCH or PUSCH). In some cases, the UE 115 may identify resources for data transmission based on an index of a control channel transmission. In some cases, there may be a predetermined delay between control channel transmissions and data channel transmissions. The UE 115 may then enter a low power state when it is not scheduled to transmit or receive data.

Figure 2:
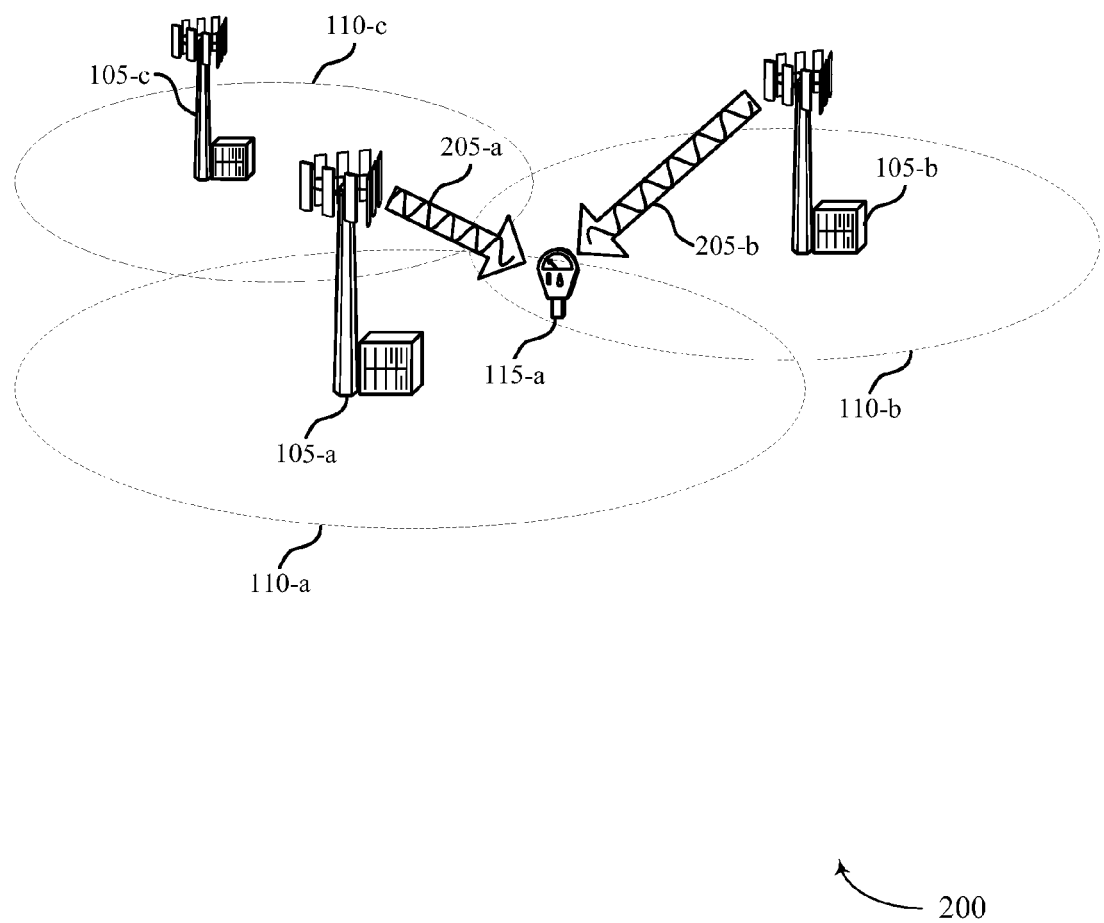
FIG. 2 illustrates an example of a wireless communications subsystem for a channel structure for a cellular IoT system in accordance with various aspects of the present disclosure.

FIG. 2 illustrates an example of a wireless communications subsystem 200 for a channel structure for a cellular IoT system in accordance with various aspects of the present disclosure. Wireless communications subsystem 200 may include UE 115-a, which may be an example of a UE 115 described above with reference to FIG. 1. Wireless communications subsystem 200 may also include base stations 105-*a*, 105-*b*, and 105-*c*, which may be examples of a base station 105 described above with reference to FIG. 1. Base stations 105-*a*, 105-*b*, and 105-*c* may have coverage areas 110-*a*, 110-*b*, and 110-*c*, respectively, which may overlap, and which may be examples of coverage area 110 described with reference to FIG. 1. Base stations 105-*a*, 105-*b* and 105-*c* may each be a part of a local group of cells utilizing a common synchronization channel.

UE 115-*a* may communicate with base station 105-*a* via an uplink and downlink, as described above in FIG. 1. In order to establish a connection with base station 105-*a* and 105-*b*, UE 115-*a* may perform an initial access procedure in which a known waveform is used. For example, known waveform 205-*a* used for initial acquisition of base station 105-*a* may be the same as known waveform 205-*b* used for subsequent connection to base station 105-*b*. One or more cells associated with base station 105-*c* and other cells in the local group may also utilize the same known waveform. In some examples the known waveforms 205-*a* and 205-*b* may be transmitted on a physical common synchronization channel (PCSCH). In some examples PBCH may also utilize a known waveform and PCSCH may be a different known waveform 205. Known waveform 205 may be used for initial access for any base station 105 with overlapping coverage area 110, or for any base station common to a group of cells in a local region, but without overlapping coverage area 110.

In some examples, the known waveform may convey system information such as PBCH timing. UE 115-*a* may utilize the system information to synchronize to PBCH and thus access information carried by PBCH (e.g., the MIB). For instance, PBCH may convey information such as network configuration, access control, and channel configuration. In some cases, PBCH may convey time/frequency information of PRACH, PDCCH, and PDSCH/PUSCH. For example, PBCH may indicate the configuration of PRACH so that new UEs 115 may determine where to access. PBCH may indicate the configuration of PDCCH so that active UEs 115 may determine how to decode control information. PBCH may also indicate the configuration of PDSCH/PUSCH so that active UEs may determine how to receive and/or send data traffic.

Thus, UE 115-*a* may synchronize with a cell using a waveform 205-*a* (or 205-*b*) which is known to UE 115-*a* beforehand, and common to a group of cells (e.g., cells associated with base stations 105-*a*, 105-*b*, 105-*c*) in the local region. In some examples, PCSCH and PBCH may utilize different known waveforms. The UE 115-*a* may determine a PBCH time from information conveyed by the known synchronization waveform 205-*a*. UE 115-*a* may then receive PBCH and use it to determine a physical layer ID for the cell and a frequency for uplink transmissions. The PBCH may also indicate a channel configuration, which may enable UE 115-*a* to perform a RACH. The channel configuration may include a time and frequency resource configuration of a shared traffic channel. In some cases, UE 115-*a* may determine resources for data transmission based on an index of a control channel transmission. In some cases, there may be a predetermined delay between control channel transmissions and data channel transmissions. In such instance, UE 115-*a* may then enter a low power state during the delay.

Figure 3A:
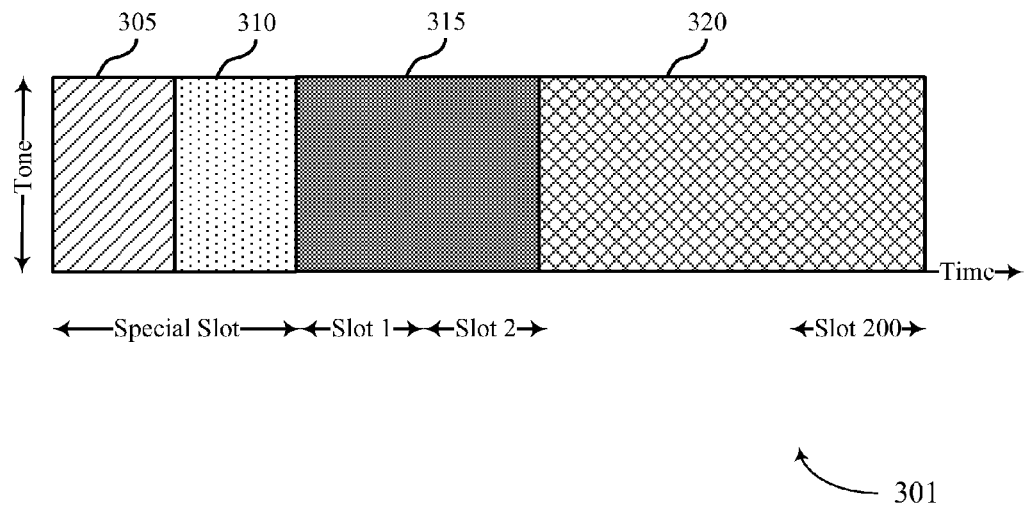
FIG. 3A illustrates an example of a downlink channel multiplexing configuration for a channel structure for a cellular IoT system in accordance with various aspects of the present disclosure.

FIG. 3A illustrates an example of a downlink channel multiplexing configuration 301 for a channel structure for a cellular IoT system in accordance with various aspects of the present disclosure. Downlink channel multiplexing configuration 301 may be used by a base station 105 to communicate with a UE 115 as described above with reference to FIG. 1 or 2. In order to accommodate multiple channels, a downlink signal may comprise radio resources allocated to channels in time-multiplexed manner (e.g., channels may be allocated time slots). Downlink channel multiplexing configuration 301 depicts an example scenario in which downlink channels PCSCH 305, PBCH 310, PDCCH 315, and PDSCH 320 are time-multiplexed. In some cases, each channel may be assigned a different number of slots (i.e., half-subframes). For example, as illustrated, PDCCH 315 may be allocated 2 slots. PDCCH 315 may convey paging, RACH response, HARQ, power control, and DL/UL assignment information. For example, PDCCH 315 may convey information a UE 115 may use to access its assigned data traffic on PDSCH 320.

In the example depicted in FIG. 3A, PCSCH 305 and PBCH 310 are shown with equal time allocations. However, a time-multiplexed channel may be allocated any amount of available radio resources. Additionally, the radio resources allocated to a channel may be the same for every frame, or different for different frames. In some instances, PCSCH 305 and PBCH 310 may be of fixed lengths for every frame, while PDCCH 315 and PDSCH 320 may be of variable lengths.

Figure 3B:
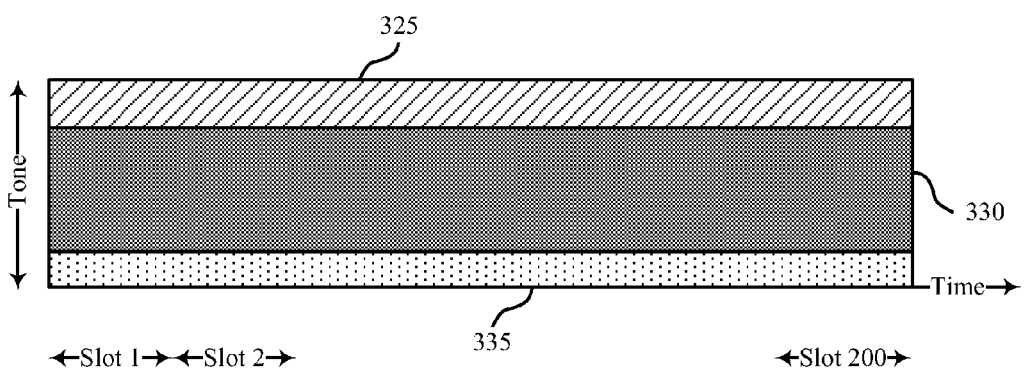
FIG. 3B illustrates an example of an uplink channel multiplexing configuration for a channel structure for a cellular IoT system in accordance with various aspects of the present disclosure.

FIG. 3B illustrates an example of an uplink channel multiplexing configuration 302 for a channel structure for a cellular IoT system in accordance with various aspects of the present disclosure. Uplink channel multiplexing configuration 302 may be used by a UE 115 to communicate with a base station 105, as described above with reference to FIG. 1 or 2. In order to accommodate multiple channels, an uplink signal may comprise channels which have been allocated radio resources in frequency-multiplexed manner (e.g., channels may be allocated certain frequencies). For example, uplink channel multiplexing configuration 302 may allocate different sets of frequencies for PRACH 325, PUSCH 330, and PUCCH 335.

PRACH 325 may be used for initial random access and on-demand request for PUSCH of active UEs 115. PUSCH may comprise data traffic and PUCCH may convey uplink control information (UCI) such as channel quality information and acknowledgement (ACK)/negative acknowledgement (NACK) information. The allocated uplink frequencies may be contiguous, as shown in FIG. 3B, but in other examples they may be non-contiguous. Based on the frequency channel multiplexing a UE 115 may transmit information related to the multiple channels simultaneously using the corresponding frequency tones.

A UE 115 may synchronize with a cell of a base station 105 using a waveform known to the UE 115 beforehand, and common to a group of cells in the local region. For example, PCSCH 305 may utilize a known waveform and may be time-multiplexed. In some cases, PBCH may also be a known waveform. The UE 115 may use information conveyed by the known wave form to determine a PBCH 310 transmission time. The UE 115 may then receive PBCH 310 and use it to determine a physical layer ID for the cell and a frequency for uplink transmissions. PBCH 310 may also indicate a channel configuration, (e.g., downlink channel multiplexing configuration 301) which may enable the UE 115 to perform a random access procedure. The channel configuration may include a time and frequency resource configuration of a shared traffic channel (e.g., PDSCH 320). In some cases, the UE 115 may determine resources for data transmission based on an index of a control channel transmission. In some cases, there may be a predetermined delay between control channel transmissions and data channel transmissions such that the UE 115 may then enter a low power state during the delay.

Figure 4:
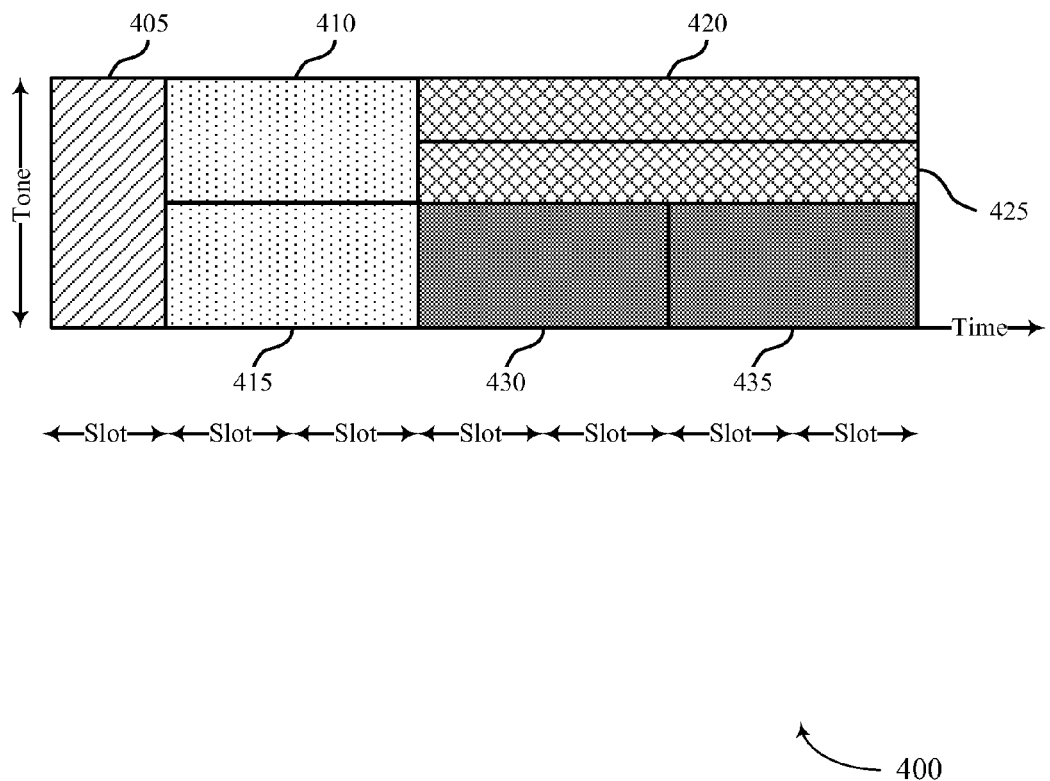
FIG. 4 illustrates an example of a physical shared channel with time- and frequency-multiplexed segments for a channel structure for a cellular IoT system in accordance with various aspects of the present disclosure.

FIG. 4 illustrates an example of a resource allocation 400 with time- and frequency-multiplexed segments for a channel structure for a cellular IoT system in accordance with various aspects of the present disclosure. Resource allocation 400 may be an example of PDSCH 320 or PUSCH 330, as described with reference to FIGS. 1, 2, 3A and 3B. Resource allocation 400 may be provided by a base station 105 to a UE 115 as described above with reference to FIG. 1 or 2 and may be used in conjunction with a common synchronization channel and a multiplexing configuration as described above with reference to FIGS. 2, 3A and 3B. Resource allocation 400 depicts an illustrative example including four tones, but the number of tones available may be more than four. In some cases, the number of tones for flexible allocation may be equal to the number of subcarriers in the carrier (e.g., 1200 subcarriers for a 20 MHz carrier).

A segment may comprise all the tones available for allocation, (e.g., segment 405 or a portion of the available tones (e.g., segment 420 and segment 425). In some instances, (e.g., segment 420 and segment 425) may comprise the smallest narrowband carrier in terms of bandwidth (e.g., a 15 KHz subcarrier). Other resource segments (e.g., segments 410, 415, 430, and 435) may use an intermediate bandwidth. The number of slots used by a resource segment may be inversely proportional to the number of tones in the segment. For example, segment 405, which comprises four tones available for allocation, may use only one slot while segment 410, which comprises two tones available, may use twice as many time slots. Segment 420, which comprises only one tone, may use four-times as many slots. The time-frequency resources of resource allocation 400 may be assigned to the same UE 115 or different UEs 115, and may be dynamically and flexibly allocated. For example, segments 405, 410, and 415 may be allocated to one UE 115, segments 420 and 425 may be allocated to a second UE 115 and segments 430 and 435 may be allocated to a third UE 115. In some cases, the bandwidth of the segments assigned to a UE 115 may correspond to the power limitations of the device. For example, a power limited UE 115 may be allocated a wider bandwidth to enable the device to power down radio components during a longer sleep period.

Thus, a UE 115 may synchronize with a cell using a waveform known to the UE 115 beforehand, and common to a group of cells in the local region. The UE 115 may then use information conveyed by PCSCH 305 to determine a PBCH 310 time. The UE 115 may receive the PBCH 310 and use it to determine a physical layer ID for the cell and a frequency for uplink transmissions. The PBCH 310 may also indicate a channel configuration, which may enable the UE 115 to perform a random access procedure. The channel configuration may include a flexible time and frequency resource configuration utilizing segments with different numbers of tones and slots as illustrated in the example resource allocation 400. In some cases, the UE 115 may determine resources for data transmission (e.g., the slots and tones for the resource segments) based on an index of a control channel transmission. In some cases, there may be a predetermined delay between control channel transmissions and data channel transmissions such that the UE 115 may then enter a low power state during the delay.

Figure 5:
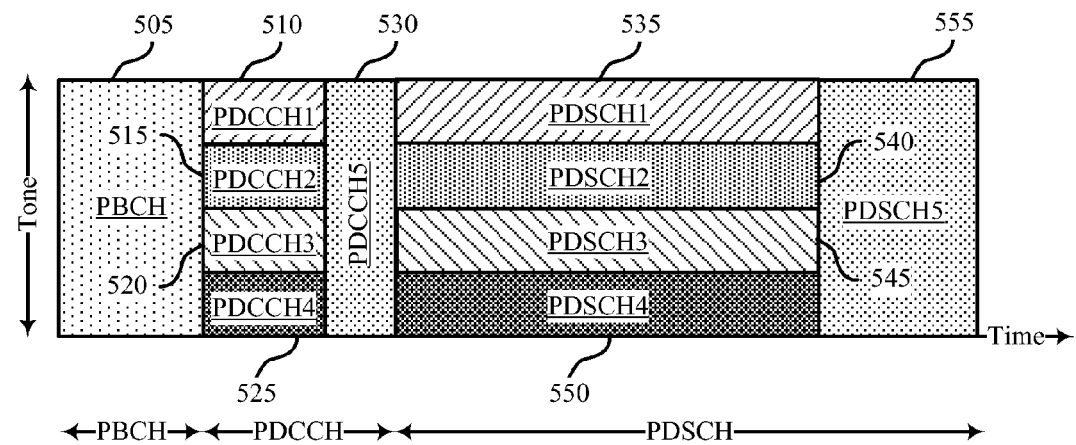
FIG. 5 illustrates an example of a downlink channel segment configuration for a channel structure for a cellular IoT system in accordance with various aspects of the present disclosure.

FIG. 5 illustrates an example of a downlink channel segment configuration 500 for a channel structure for a cellular IoT system in accordance with various aspects of the present disclosure. Downlink channel segment configuration 500 may be used for communication between a UE 115 and a base station 105 as described in reference to FIGS. 1-4.

In some examples, shared channels such as PDSCH 320 or PUSCH 330 may be transmitted at different times on various frequencies arranged in a time/frequency tiling as illustrated by downlink channel segment configuration 500. For example, PDSCH 320 may be organized into segments that may be tiled across radio resources. A UE 115 may identify assigned PDSCH segments by determining the index of successfully decoded PDCCH. For example, the UE 115 may receive PBCH 505 which may convey information regarding the configuration of a PDCCH 315 and a corresponding configuration of a PDSCH 320. The UE 115 may attempt to decode the PDCCH segments (e.g., PDCCH1 510, PDCCH2 515, PDCCH3 520, and PDCCH4 525) and determine the index of each successfully decoded segment (i.e., each segment directed toward the UE 115). PDSCH segments (e.g., PDSCH1 535, PDSCH2 540, PDSCH3 545, and PDSCH4 550) assigned to the UE 115 may have an index corresponding to the PDCCH segments for the UE 115.

For example, a UE 115 may decode channel segment PDCCH1 510 to identify assigned channel segment PDSCH1 535. As another example, a UE 115 may decode multiple channel segments (e.g., PDCCH segments 1-4) to identify multiple corresponding PDSCH segments (e.g., PDSCH segments 1-4).

In another example, a UE 115 may decode channel segment PDCCH5 530 to determine it has been assigned channel segment PDSCH5 555. In such an instance, the UE 115 may determine that it may sleep during channel segments PDSCH1 535, PDSCH2 540, PDSCH3 545, and PDSCH4 550. The UE 115 may then wake up to receive channel segment PDSCH5 555. In other words, an active UE 115 may wake up at the beginning of a frame, decode the control messages (e.g., PBCH 505 and PDCCH 315), enter a low power mode, and then re-activate radio components when an assigned PDSCH segment (or PUSCH segment) such as PDSCH5 555 is scheduled. This may enable the UE 115 to conserve power. In some embodiments a base station 105 may implement an activity time-out mechanism to move an active UE 115 into sleep mode. Additionally, a UE 115 may send a termination message to base station 105 (e.g., together with traffic in an assigned PUSCH segment).

Thus, a UE 115 may synchronize with a cell using a waveform known to the UE 115 beforehand, and common to a group of cells in the local region. The UE 115 may then determine timing for a PBCH 505. The PBCH 505 may indicate the downlink channel segment configuration 500. In some cases, the UE 115 may determine resources for data transmission (e.g., PDSCH5 555) based on an index of a control channel transmission (e.g., PDCCH5 525). In some cases, there may be a predetermined delay between the control channel transmission and data channel transmission such that the UE 115 may then enter a low power state during the delay.

Figure 6:
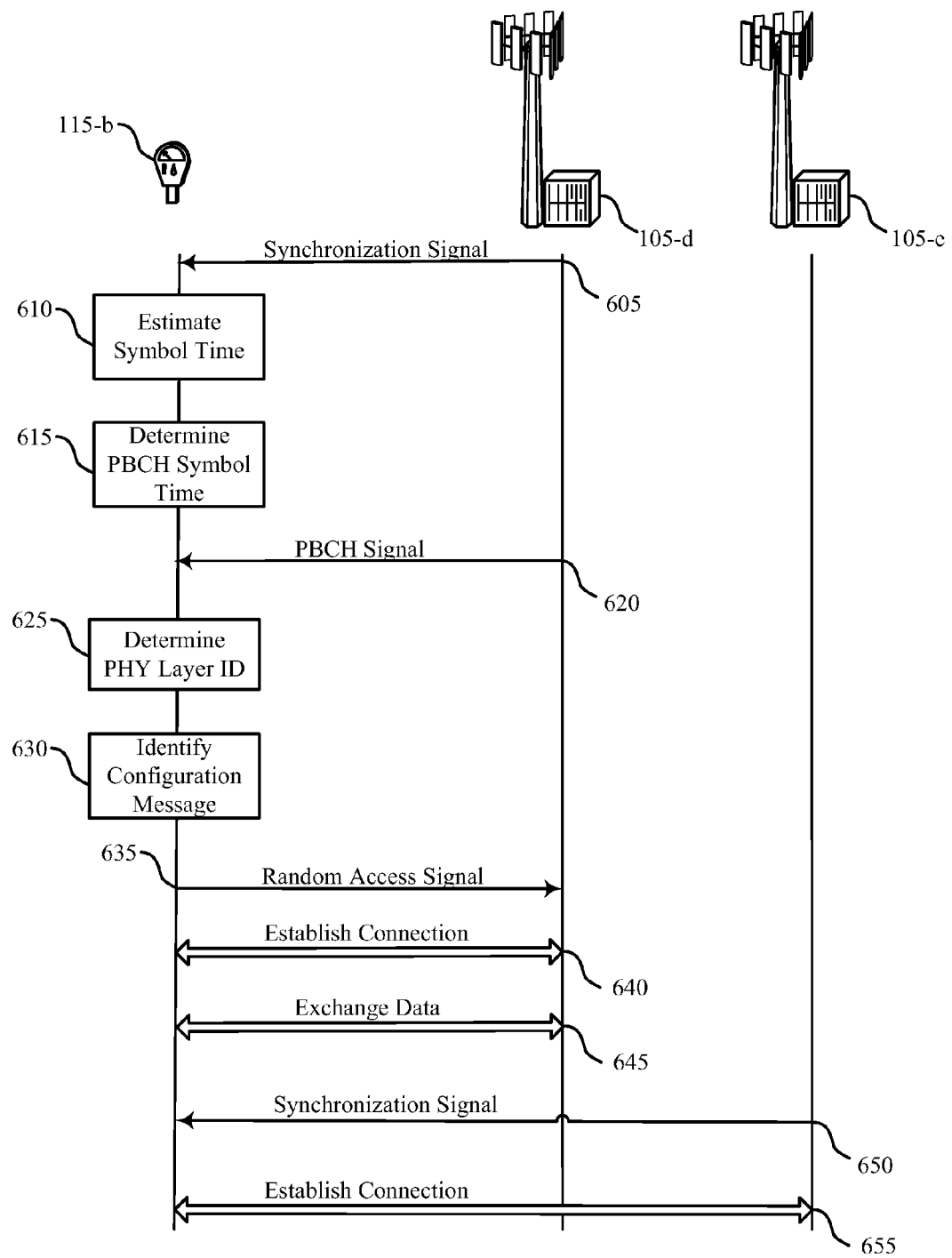
FIG. 6 illustrates an example of a process flow diagram for cell acquisition for a channel structure for a cellular IoT system in accordance with various aspects of the present disclosure.

FIG. 6 illustrates an example of a process flow diagram 600 for cell acquisition utilizing a channel structure for a cellular IoT system in accordance with various aspects of the present disclosure. Process flow diagram 600 for cell acquisition may include a UE 115-b, which may be an example of a UE 115 described above with reference to FIGS. 1 and 2. Process flow diagram 600 for cell acquisition may also include base stations 105-d and 105-e, which may be examples of a base station 105 described above with reference to FIGS. 1 and 2. Base station 105-d and base station 105-e may have overlapping coverage areas 110 and may be part of a local group of cells sharing a known waveform (for PCSCH or PBCH).

At step 605, UE 115-b may receive a first synchronization signal from base station 105-e on a common synchronization channel. The first synchronization signal may be a waveform known to UE 115-b prior to receiving the signal. In some embodiments, UE 115-b may estimate a carrier frequency based on the first synchronization signal. For example, UE 115-b may compare the estimated carrier frequency of the first synchronization signal and a frequency generated by a local oscillator of UE 115-b and use the feedback to fine tune the oscillator. In some instances, UE 115-b may generate an uplink carrier frequency based on the comparison and transmit an uplink signal with the generated uplink carrier frequency.

At step 610, UE 115-b may estimate a symbol time of the first synchronization signal. At step 615, UE 115-b may then determine a PBCH symbol time based on the estimated symbol time of the first synchronization signal. At step 620, UE 115-b may receive a PBCH signal based on the PBCH symbol time. The length of the PBCH may be fixed, and known a priori to UE 115-b. Subsequently, at step 625, UE 115-b may determine a physical layer ID of the first cell based on the received PBCH signal.

At step 630, UE 115-b may identify a configuration message based on the PBCH signal. In some cases, the UE 115-b may receive a control channel transmission that specifies an ID for UE 115-b and an index of a time frequency resource for a data channel transmission on the shared data traffic channel. That is, the PBCH signal may comprise a configuration message specifying a time/frequency configuration of the shared data traffic channel. The resource configuration may be for a DL shared channel or for an UL shared channel. Thus, UE 115-b may receive data according to the indicated time frequency resources and in some cases, UE 115-b may transmit data using the resources.

In some examples, the transmission power of the control channel transmission is proportional to a transmission power of the data channel transmission. In some examples, the transmission power is based on a path loss between base station 105-d (or 105-e) and UE 115-b.

At step 635, UE 115-b may transmit a random access signal to the first cell based on the received configuration message. Subsequently, at step 640, UE 115-b may establish a first connection to the first cell.

At step 645, UE 115-b may exchange data with base station 105-d based on the channel structure specified by the configuration message. The channel structure may be flexible and may include a configuration for a shared channel tiling pattern based on a predetermined table. The predetermined table may include configuration options that may be specified by the configuration message transmitted in PBCH. In some cases, UE 115-b may exchange data with a network based on machine type communication (MTC) procedures. In some instances, the control channel transmission may indicate a delay between the control channel transmission and the data channel transmission. UE 115-b may then initiate a wake up timer based on the delay, enter a low power mode, and wake up (for transmission or reception of data) upon expiration of the sleep wake up timer.

At step 650, UE 115-b may receive a second synchronization signal (using the same waveform as the first synchronization signal) from base station 105-e on a common synchronization. For example, if channel quality between UE 115-b and base station 105-d deteriorates, UE 115-b may be directed to handover to base station 105-e. At step 655, UE 115-b may establish a second connection with base station 105-e based on the second synchronization signal. UE 115-b may then receive a new channel configuration from base station 105-e and exchange data based on the new configuration.

Figure 7:
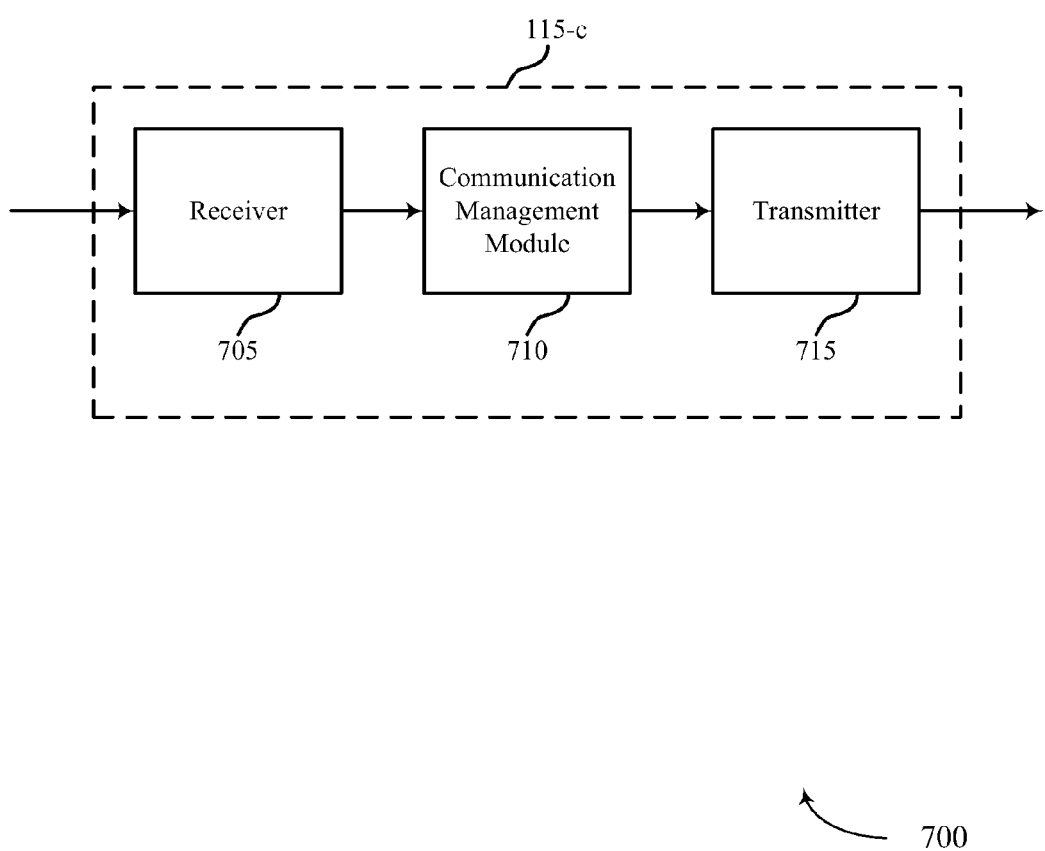
FIG. 7 shows a block diagram of a user equipment (UE) configured for a channel structure for a cellular IoT system in accordance with various aspects of the present disclosure.

FIG. 7 shows a block diagram 700 of a UE 115-c configured for a channel structure for a cellular IoT system in accordance with various aspects of the present disclosure. UE 115-c may be an example of aspects of a UE 115 described with reference to FIGS. 1-6. UE 115-c may include a receiver 705, a communication management module 710, and/or a transmitter 715. UE 115-c may also include a processor. Each of these components may be in communication with each other.

The receiver 705 may receive information such as packets, user data, and/or control information associated with various information channels (e.g., control channels, data channels, and information related to a channel structure for a cellular IoT system, etc.). Information may be passed on to the communication management module 710, and to other components of UE 115-c. In some examples, the receiver 705 may receive the data channel transmission on the time frequency resource of the shared data traffic channel. In some examples, the receiver 705 may be put into a low power mode during a sleep interval and then powered up to receive a data channel transmission upon expiration of a sleep wake up timer.

The communication management module 710 may receive a first synchronization signal from a first cell on a common synchronization channel of the first cell, wherein the first synchronization signal is a waveform known to the UE 115 prior to receiving the signal, estimate a symbol time of the first synchronization signal, determine a PBCH symbol time of the first cell based on the estimated symbol time of the first synchronization signal, receive a PBCH signal based at least in part on the PBCH symbol time, and determine a physical layer ID of the first cell based on the received PBCH signal.

The transmitter 715 may transmit signals received from other components of UE 115-c. In some embodiments, the transmitter 715 may be collocated with the receiver 705 in a transceiver module. The transmitter 715 may include a single antenna, or it may include a plurality of antennas. In some examples, the transmitter 715 may transmit an uplink signal with the generated uplink carrier frequency. In some examples, the transmitter 715 may transmit the data channel transmission on the time frequency resource of the shared data traffic channel. In some examples, the transmitter 715 may be put into a low power mode during a sleep interval and then powered up to transmit a data channel transmission upon expiration of a sleep wake up timer.

Figure 8:
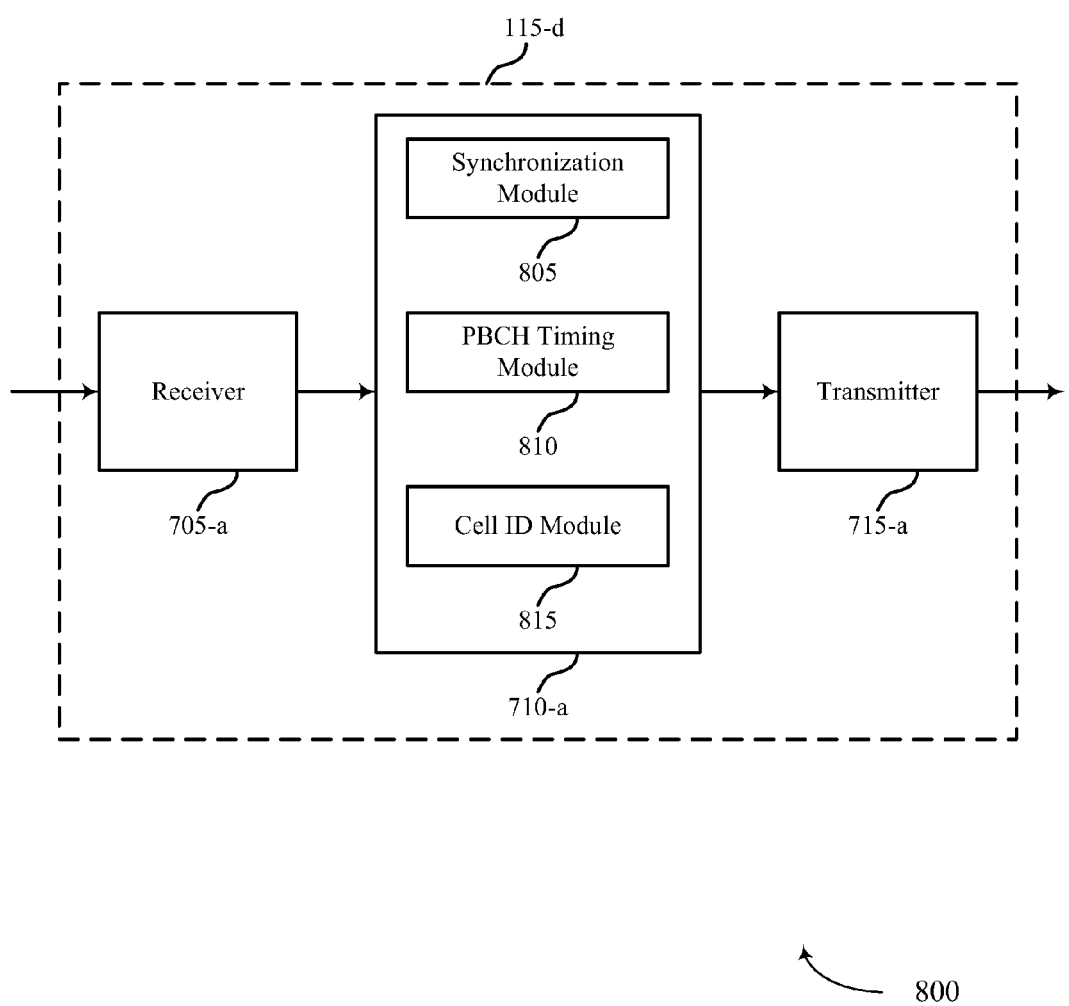
FIG. 8 shows a block diagram of a UE configured for a channel structure for a cellular IoT system in accordance with various aspects of the present disclosure.

FIG. 8 shows a block diagram 800 of a UE 115-d for a channel structure for a cellular IoT system in accordance with various aspects of the present disclosure. UE 115-d may be an example of aspects of a UE 115 described with reference to FIGS. 1-7. UE 115-d may include a receiver 705-a, a communication management module 710-a, or a transmitter 715-a. UE 115-d may also include a processor. Each of these components may be in communication with each other. The communication management module 710-a may also include a synchronization module 805, a PBCH timing module 810, and a cell ID module 815.

The receiver 705-a may receive information which may be passed on to communication management module 710-a, and to other components of UE 115-d. The communication management module 710-a may perform the operations described above with reference to FIG. 7. The transmitter 715-a may transmit signals received from other components of UE 115-d.

The synchronization module 805 may receive a first synchronization signal from a first cell on a common synchronization channel of the first cell, wherein the first synchronization signal is a waveform known to the UE prior to receiving the signal as described above with reference to FIGS. 2-6. The synchronization module 805 may also estimate a symbol time of the first synchronization signal. The synchronization module 805 may also receive a second synchronization signal from a second cell on a common synchronization channel of the second cell, the second cell being different from the first cell, wherein the first and second synchronization signals use the same waveform.

The PBCH timing module 810 may determine a PBCH symbol time of the first cell based on the estimated symbol time of the first synchronization signal as described above with reference to FIGS. 2-6. The PBCH timing module 810 may also receive a PBCH signal based at least in part on the PBCH symbol time. In some examples, a length of the PBCH signal may be fixed and known to the UE prior to receiving the PBCH signal.

The cell ID module 815 may determine a physical layer ID of the first cell based on the received PBCH signal as described above with reference to FIGS. 2-6.

Figure 9:
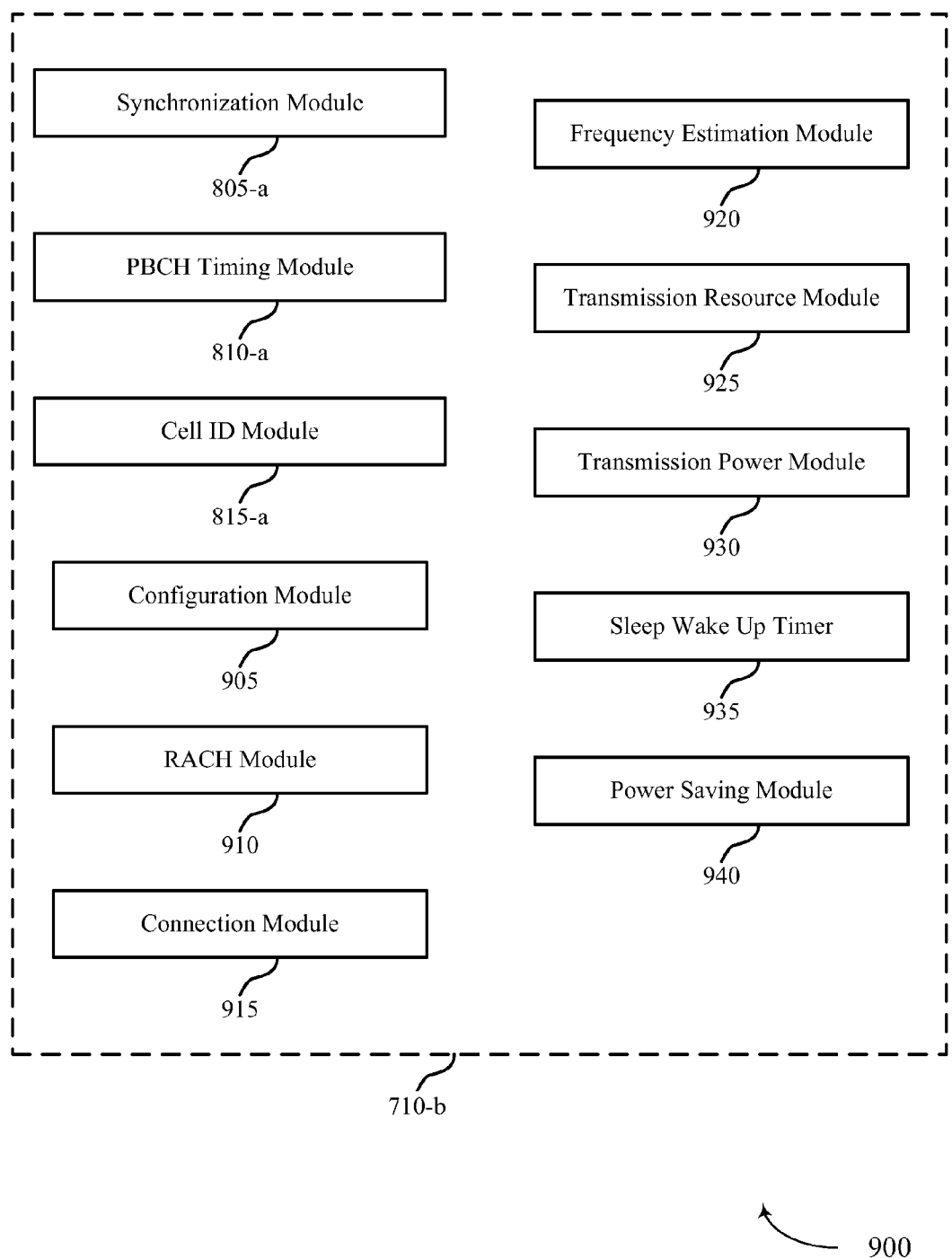
FIG. 9 shows a block diagram of a communication management module configured for a channel structure for a cellular IoT system in accordance with various aspects of the present disclosure.

FIG. 9 shows a block diagram 900 of a communication management module 710-b for a channel structure for a cellular IoT system in accordance with various aspects of the present disclosure. The communication management module 710-b may be an example of aspects of a communication management module 710 described with reference to FIGS. 7-8. The communication management module 710-b may include a synchronization module 805-a, a PBCH timing module 810-a, and a cell ID module 815-a. Each of these modules may perform the functions described above with reference to FIG. 8. The communication management module 710-b may also include a configuration module 905, a RACH module 910, a connection module 915, a frequency estimation module 920, a transmission resource module 925, a transmission power module 930, a sleep wake up timer 935, and a power saving module 940.

The configuration module 905 may identify a configuration message based on a PBCH signal as described above with reference to FIGS. 2-6. The configuration module 905 may also exchange data with a first or second cell based on a channel structure specified by the configuration message. In some examples, the PBCH signal comprises a configuration message specifying a time and frequency resource configuration of a shared data traffic channel for transmitting payload data traffic. In some examples, the control channel transmission comprises a delay between a timing of the control channel transmission and a timing of the data channel transmission. In some examples, the control channel transmission comprises a delay between a timing of the control channel transmission and a timing of the data channel transmission. The configuration module 905 may also exchange data using a set of channels with segments arranged according to a flexible time and frequency tiling pattern of a flexible channel structure. In some examples, the flexible channel structure comprises a configuration of a shared channel tiling pattern based on a predetermined table and the configuration may be specified by the configuration message transmitted in the PBCH signal. In some examples, an index of the time frequency resource indicates an index of the predetermined table.

The RACH module 910 may transmit (in coordination with transmitter 715) a random access signal to the first cell based on the received configuration message as described above with reference to FIGS. 2-6.

The connection module 915 may establish a first connection to the first cell as described above with reference to FIGS. 2-6. The connection module 915 may also establish a second connection to the second cell based on the second synchronization signal. In some examples, the first cell and the second cell are elements of a set of cells sharing the known waveform, wherein each cell from the set of cells has an overlapping coverage area with another cell from the set of cells.

The frequency estimation module 920 may estimate a carrier frequency of the first synchronization signal as described above with reference to FIGS. 2-6. The frequency estimation module 920 may also compare the estimated carrier frequency of the first synchronization signal and a local carrier frequency generated by a local oscillator of the UE. The frequency estimation module 920 may then generate an uplink carrier frequency as a function of the comparison.

The transmission resource module 925 may receive a control channel transmission that specifies an ID of the UE and an index of a time frequency resource for a data channel transmission on the shared data traffic channel as described above with reference to FIGS. 2-6.

The transmission power module 930 may be configured such that a transmission power of the control channel transmission may be proportional to a transmission power of the data channel transmission as described above with reference to FIGS. 2-6. In some examples, the transmission power of the control channel transmission may be based on a path loss of the UE.

The sleep wake up timer 935 may initiate a sleep wake up timer based on the timing of the data channel transmission as described above with reference to FIGS. 2-6. The sleep wake up timer 935 may also initiate a sleep wake up timer based on the timing of the data channel transmission.

The power saving module 940 may enter (or cause the UE to enter) a power saving mode based at least in part on initiating the sleep wake up timer as described above with reference to FIGS. 2-6. The power saving module 940 may also enter (and then terminate) a power saving mode based at least in part on the sleep wake up timer.

Figure 10:
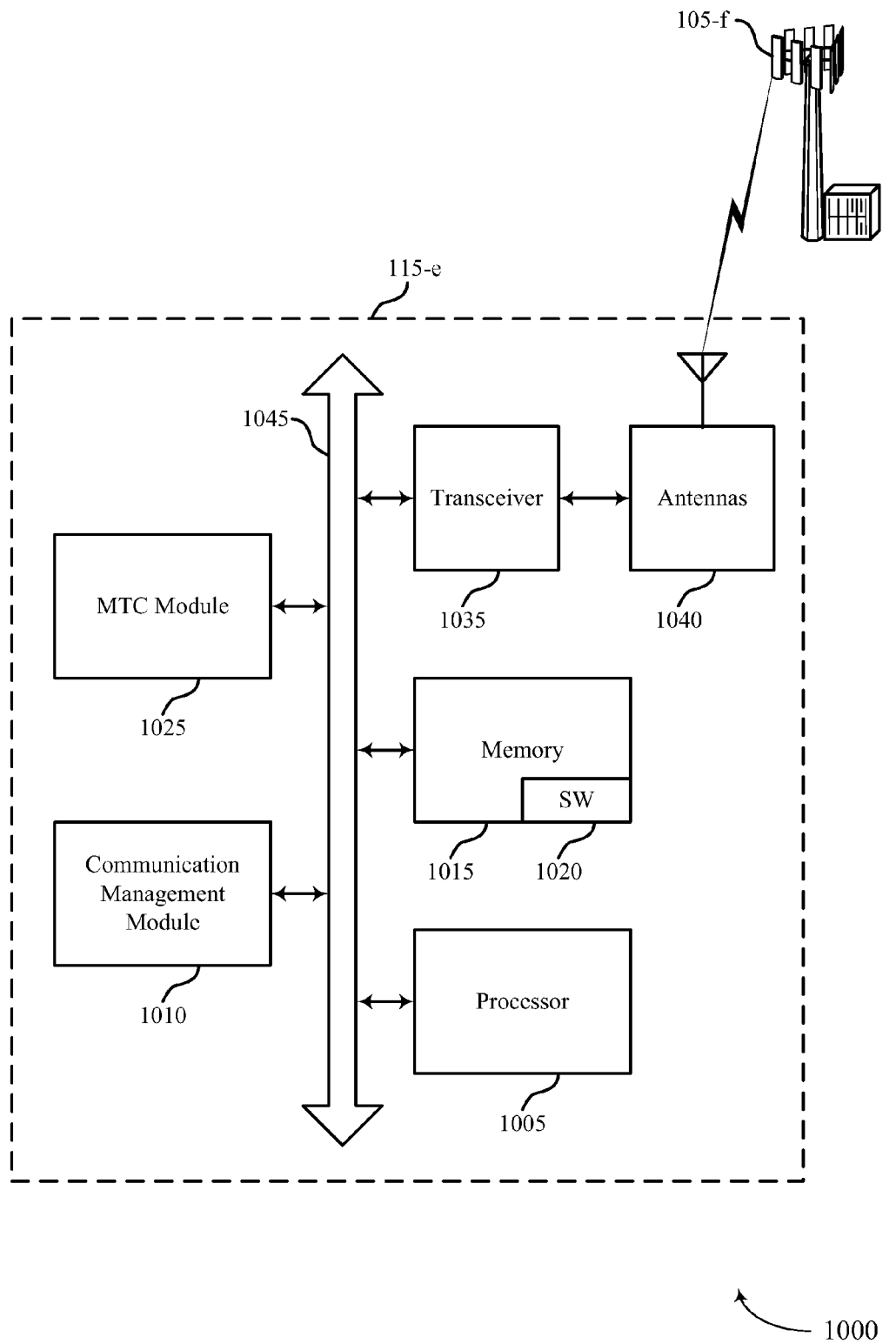
FIG. 10 illustrates a block diagram of a system including a UE configured for a channel structure for a cellular IoT system in accordance with various aspects of the present disclosure.

FIG. 10 shows a diagram of a system 1000 including a UE 115-e configured for a channel structure for a cellular IoT system in accordance with various aspects of the present disclosure. System 1000 may include UE 115-e, which may be an example of a UE 115 described above with reference to FIGS. 1-9. UE 115-e may include a communication management module 1010, which may be an example of a communication management module 710 described with reference to FIGS. 7-9. UE 115-e may also include a MTC module 1025. UE 115-e may also include components for bi-directional voice and data communications including components for transmitting communications and components for receiving communications. For example, UE 115-e may communicate bi-directionally with base station 105-f.

The MTC module 1025 may exchange data with a network based on MTC procedures as described above with reference to FIGS. 2-6. For example, the MTC module 1025 may facilitate improved communication between the UE 115-e and a base station 105-f by using open loop timing synchronization to determine transmit symbol time. In this example, the MTC module 1025 may also facilitate the use of an extended cyclic prefix length in uplink transmissions, while non-extended cyclic prefix lengths may be used with downlink transmissions. By using extended uplink cyclic prefixes, uplink signals from different UEs 115 may arrive at a base station 105-f within a window of time (e.g., the maximum round-trip delay between the UE 115 and the base station 105-f) covered by the uplink cyclic prefix.

In other examples of a MTC procedures, UE 115-e may utilize orthogonal frequency division multiple access (OFDMA) for demodulating downlink messages and a combination of Gaussian minimum shift keying (GMSK) and single carrier frequency division multiple access (SC- FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

In other examples of a MTC procedures, the MTC module 1025 may be configured to identify time or frequency resources allocated to UE 115-*e* by base station 105-*f*. In this example, the resource allocation may be apportioned based on a type and class of PRACH signal scheduled for transmission. For instance, the MTC module 1025 may determine that UE 115-*e* is assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at UE 115-*e*).

In other examples of a MTC procedures, UE 115-*e* may perform an initial access procedure to establish a connection with a serving cell. UE 115-*e* may then arrange a regular transmission schedule with the serving cell including a discontinuous transmission (DTX) cycle and an acknowledgement schedule. UE 115-*e* may enter a low power mode and refrain from any transmission during the a sleep interval of the DTX cycle. UE 115-*e* may then wake up and transmit a message to the serving cell after the sleep interval without performing an another access procedure. UE 115-*e* may perform another access procedure to transmit at times not covered by the regular transmission schedule. For example, if an acknowledgement (ACK) for the message isn't received, UE 115-*e* may perform another access procedure for retransmission.

In other examples of a MTC procedures, the MTC module 1025 may facilitate using stored control information from a first communication session with the base station to determine the power and timing control information for a subsequent second communication session. Specifically, in this example, the MTC module 1025 may establish a first communication session with the base station 105-*f* and receive, during the first communication session, closed loop control information from the base station 105-*f* to aid the UE 115-*e* in adjusting transmit signal symbol timing or power control levels associated with an uplink transmission. In such instance, the MTC module 1025 may facilitate storing, in the memory 1015, the transmit power and symbol timing information derived from the closed loop control information during the first communication session. Subsequently, the MTC module 1025 may utilize the stored closed loop control information from the first communication session to determine the transmit signal power or symbol timing to establish a second communication session with the base station 105-*f*.

The UE 115-*e* may also include a processor module 1005, and memory 1015 (including software (SW)) 1020, a transceiver module 1035, and one or more antenna(s) 1040, each of which may communicate, directly or indirectly, with each other (e.g., via buses 1045). The transceiver module 1035 may communicate bi-directionally, via the antenna(s) 1040 and/or wired or wireless links, with one or more networks, as described above. For example, the transceiver module 1035 may communicate bi-directionally with a base station 105 and/or another UE 115. The transceiver module 1035 may include a modem to modulate the packets and provide the modulated packets to the antenna(s) 1040 for transmission, and to demodulate packets received from the antenna(s) 1040. While UE 115-*e* may include a single antenna 1040, UE 115-*e* may also have multiple antennas 1040 capable of concurrently transmitting and/or receiving multiple wireless transmissions.

The memory 1015 may include random access memory (RAM) and read only memory (ROM). The memory 1015 may store computer-readable, computer-executable software/firmware code 1020 including instructions that, when executed, cause the processor module 1005 to perform various functions described herein (e.g., a channel structure for a cellular IoT system, etc.). Alternatively, the software/firmware code 1020 may not be directly executable by the processor module 1005 but cause a computer (e.g., when compiled and executed) to perform functions described herein. The processor module 1005 may include an intelligent hardware device, (e.g., a central processing unit (CPU) such as an ARM® based processor or those made by Intel® Corporation or AMD®, a microcontroller, an ASIC, etc.)

Figure 11:
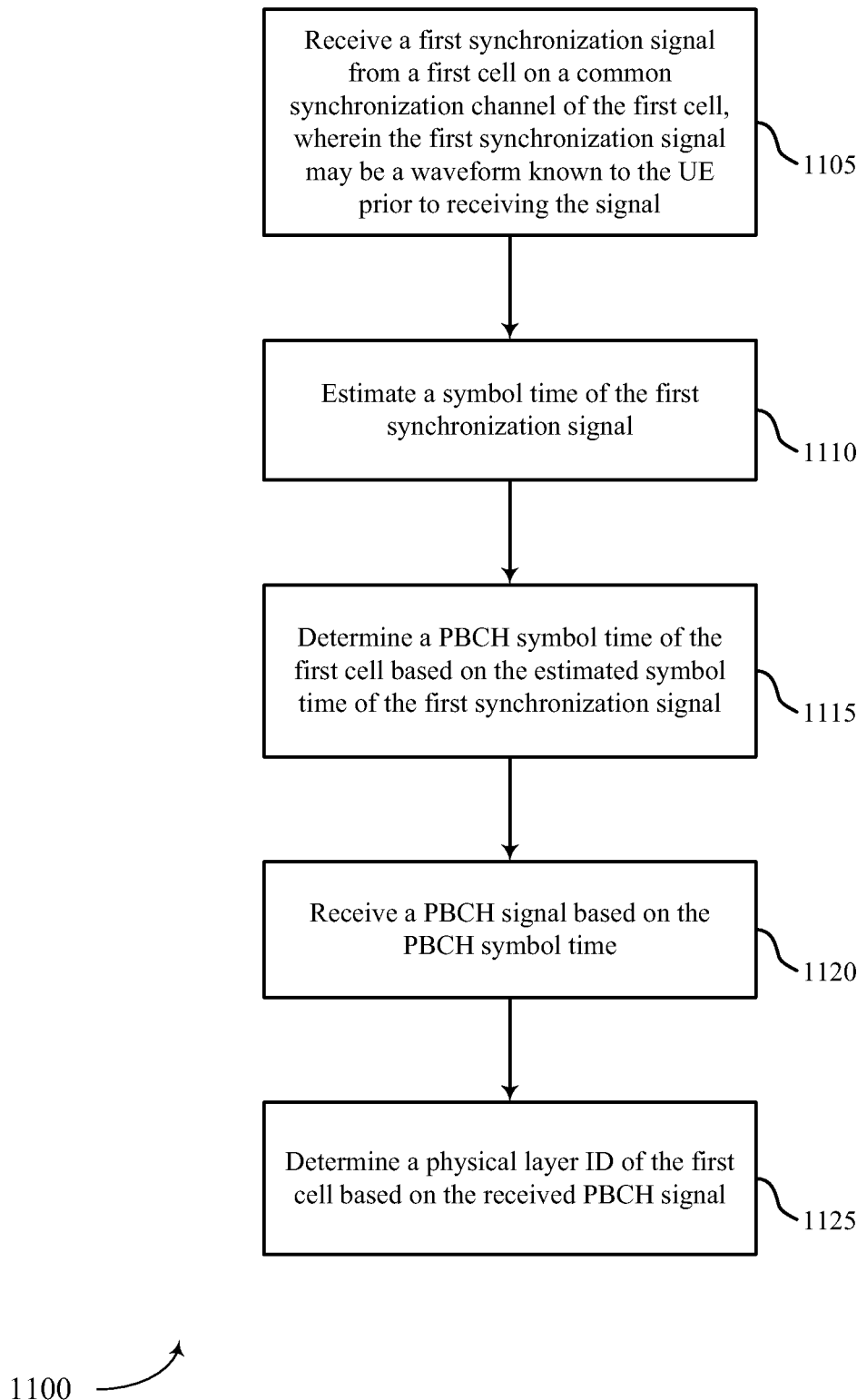
FIG. 11 shows a flowchart illustrating a method for a channel structure for a cellular IoT system in accordance with various aspects of the present disclosure.

FIG. 11 shows a flowchart illustrating a method 1100 for a channel structure for a cellular IoT system in accordance with various aspects of the present disclosure. The operations of method 1100 may be implemented by a UE 115 or its components as described with reference to FIGS. 1-10. For example, the operations of method 1100 may be performed by the communication management module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware.

At block 1105, the UE 115 may receive a first synchronization signal from a first cell on a common synchronization channel of the first cell, wherein the first synchronization signal is a waveform known to the UE prior to receiving the signal as described above with reference to FIGS. 2-6. In certain examples, the operations of block 1105 may be performed by the synchronization module 805 as described above with reference to FIG. 8.

At block 1110, the UE 115 may estimate a symbol time of the first synchronization signal as described above with reference to FIGS. 2-6. In certain examples, the operations of block 1110 may be performed by the synchronization module 805 as described above with reference to FIG. 8.

At block 1115, the UE 115 may determine a PBCH symbol time of the first cell based on the estimated symbol time of the first synchronization signal as described above with reference to FIGS. 2-6. In certain examples, the operations of block 1115 may be performed by the PBCH timing module 810 as described above with reference to FIG. 8.

At block 1120, the UE 115 may receive a PBCH signal based at least in part on the PBCH symbol time as described above with reference to FIGS. 2-6. In certain examples, the operations of block 1120 may be performed by the PBCH timing module 810 as described above with reference to FIG. 8.

At block 1125, the UE 115 may determine a physical layer ID of the first cell based on the received PBCH signal as described above with reference to FIGS. 2-6. In certain examples, the operations of block 1125 may be performed by the cell ID module 815 as described above with reference to FIG. 8.

Figure 12:
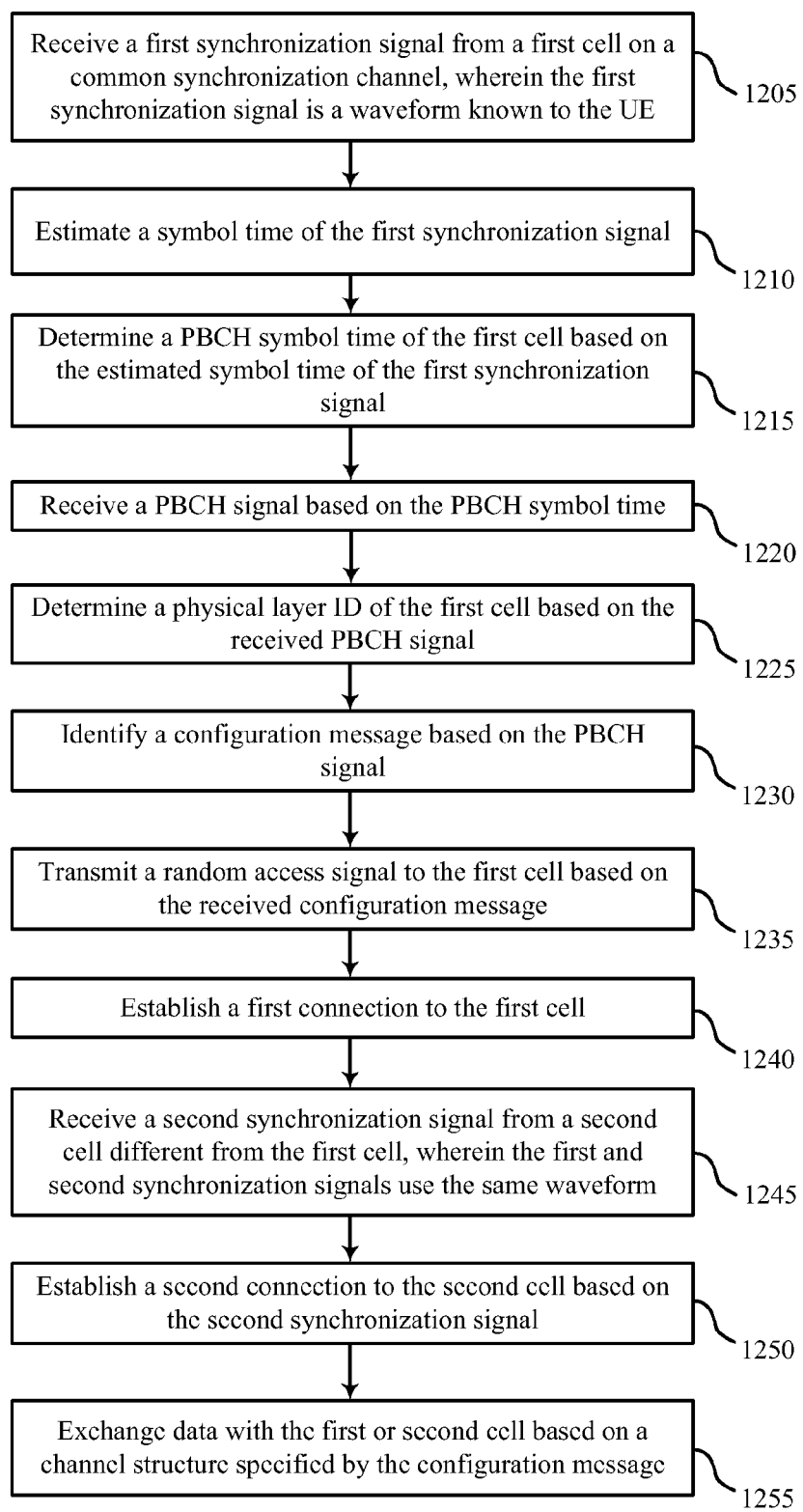
FIG. 12 shows a flowchart illustrating a method for a channel structure for a cellular IoT system in accordance with various aspects of the present disclosure.

FIG. 12 shows a flowchart illustrating a method 1200 for a channel structure for a cellular IoT system in accordance with various aspects of the present disclosure. The operations of method 1200 may be implemented by a UE 115 or its components as described with reference to FIGS. 1-10. For example, the operations of method 1200 may be performed by the communication management module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of method 1100 of FIG. 11.

At block 1205, the UE 115 may receive a first synchronization signal from a first cell on a common synchronization channel of the first cell, wherein the first synchronization signal is a waveform known to the UE prior to receiving the signal as described above with reference to FIGS. 2-6. In certain examples, the operations of block 1205 may be performed by the synchronization module 805 as described above with reference to FIG. 8.

At block 1210, the UE 115 may estimate a symbol time of the first synchronization signal as described above with reference to FIGS. 2-6. In certain examples, the operations of block 1210 may be performed by the synchronization module 805 as described above with reference to FIG. 8.

At block 1215, the UE 115 may determine a PBCH symbol time of the first cell based on the estimated symbol time of the first synchronization signal as described above with reference to FIGS. 2-6. In certain examples, the operations of block 1215 may be performed by the PBCH timing module 810 as described above with reference to FIG. 8.

At block 1220, the UE 115 may receive a PBCH signal based at least in part on the PBCH symbol time as described above with reference to FIGS. 2-6. In certain examples, the operations of block 1220 may be performed by the PBCH timing module 810 as described above with reference to FIG. 8.

At block 1225, the UE 115 may determine a physical layer ID of the first cell based on the received PBCH signal as described above with reference to FIGS. 2-6. In certain examples, the operations of block 1225 may be performed by the cell ID module 815 as described above with reference to FIG. 8.

At block 1230, the UE 115 may identify a configuration message based on the PBCH signal as described above with reference to FIGS. 2-6. In certain examples, the operations of block 1230 may be performed by the configuration module 905 as described above with reference to FIG. 9.

At block 1235, the UE 115 may transmit a random access signal to the first cell based on the received configuration message as described above with reference to FIGS. 2-6. In certain examples, the operations of block 1235 may be performed by the RACH module 910 as described above with reference to FIG. 9.

At block 1240, the UE 115 may establish a first connection to the first cell as described above with reference to FIGS. 2-6. In certain examples, the operations of block 1240 may be performed by the connection module 915 as described above with reference to FIG. 9.

At block 1245, the UE 115 may receive a second synchronization signal from a second cell on a common synchronization channel of the second cell, the second cell being different from the first cell, wherein the first and second synchronization signals use the same waveform as described above with reference to FIGS. 2-6. In certain examples, the operations of block 1245 may be performed by the synchronization module 805 as described above with reference to FIG. 8.

At block 1250, the UE 115 may establish a second connection to the second cell based on the second synchronization signal as described above with reference to FIGS. 2-6. In certain examples, the operations of block 1250 may be performed by the connection module 915 as described above with reference to FIG. 9.

At block 1255, the UE 115 may exchange data with the first or second cell based on a channel structure specified by the configuration message as described above with reference to FIGS. 2-6. In certain examples, the operations of block 1255 may be performed by the configuration module 905 as described above with reference to FIG. 9.

Figure 13:
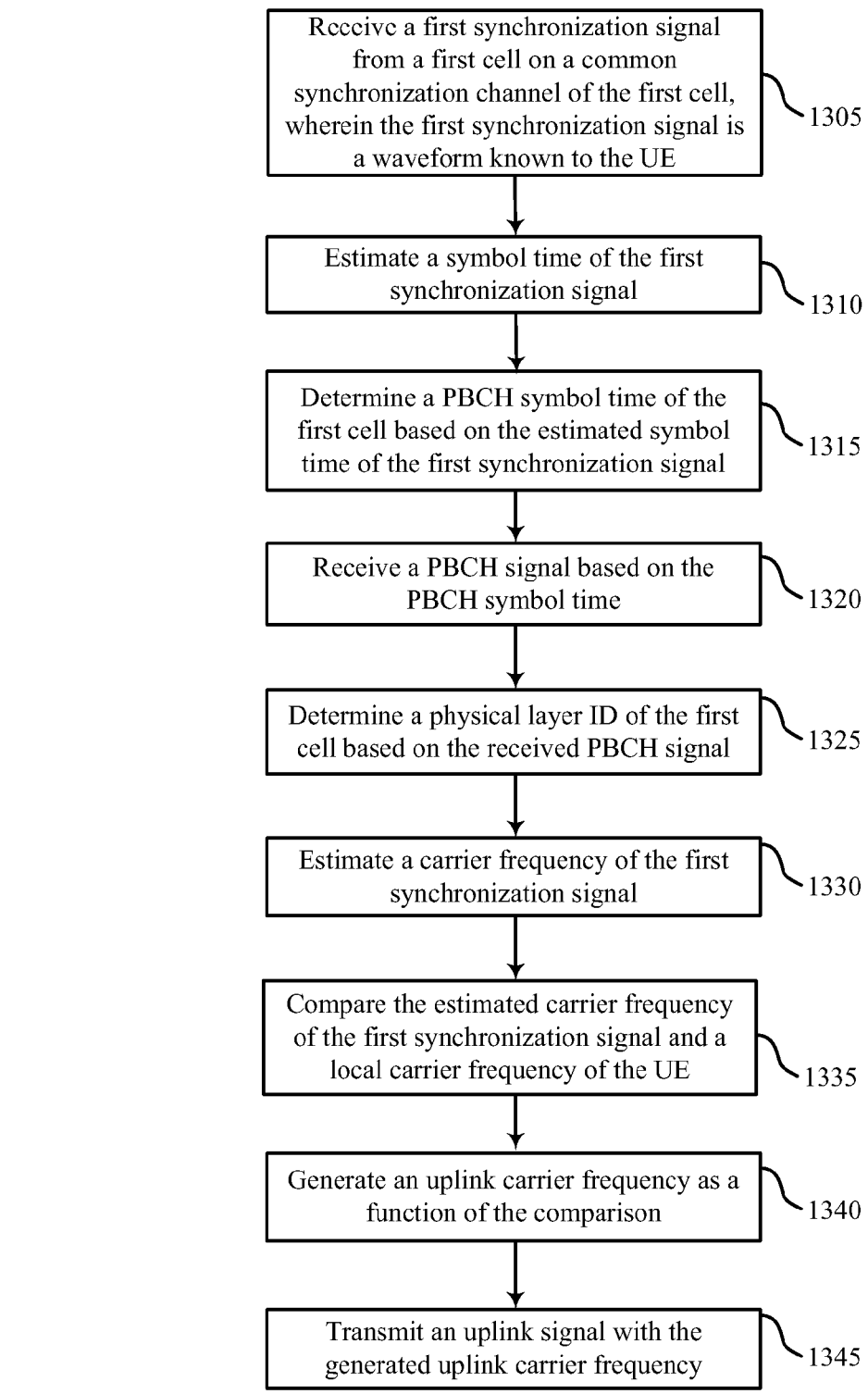
FIG. 13 shows a flowchart illustrating a method for a channel structure for a cellular IoT system in accordance with various aspects of the present disclosure.

FIG. 13 shows a flowchart illustrating a method 1300 for a channel structure for a cellular IoT system in accordance with various aspects of the present disclosure. The operations of method 1300 may be implemented by a UE 115 or its components as described with reference to FIGS. 1-10. For example, the operations of method 1300 may be performed by the communication management module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 1100, and 1200 of FIGS. 11-12.

At block 1305, the UE 115 may receive a first synchronization signal from a first cell on a common synchronization channel of the first cell, wherein the first synchronization signal is a waveform known to the UE prior to receiving the signal as described above with reference to FIGS. 2-6. In certain examples, the operations of block 1305 may be performed by the synchronization module 805 as described above with reference to FIG. 8.

At block 1310, the UE 115 may estimate a symbol time of the first synchronization signal as described above with reference to FIGS. 2-6. In certain examples, the operations of block 1310 may be performed by the synchronization module 805 as described above with reference to FIG. 8.

At block 1315, the UE 115 may determine a PBCH symbol time of the first cell based on the estimated symbol time of the first synchronization signal as described above with reference to FIGS. 2-6. In certain examples, the operations of block 1315 may be performed by the PBCH timing module 810 as described above with reference to FIG. 8.

At block 1320, the UE 115 may receive a PBCH signal based at least in part on the PBCH symbol time as described above with reference to FIGS. 2-6. In certain examples, the operations of block 1320 may be performed by the PBCH timing module 810 as described above with reference to FIG. 8.

At block 1325, the UE 115 may determine a physical layer ID of the first cell based on the received PBCH signal as described above with reference to FIGS. 2-6. In certain examples, the operations of block 1325 may be performed by the cell ID module 815 as described above with reference to FIG. 8.

At block 1330, the UE 115 may estimate a carrier frequency of the first synchronization signal as described above with reference to FIGS. 2-6. In certain examples, the operations of block 1330 may be performed by the frequency estimation module 920 as described above with reference to FIG. 9.

At block 1335, the UE 115 may compare the estimated carrier frequency of the first synchronization signal and a local carrier frequency generated by a local oscillator of the UE as described above with reference to FIGS. 2-6. In certain examples, the operations of block 1335 may be performed by the frequency estimation module 920 as described above with reference to FIG. 9.

At block 1340, the UE 115 may generate an uplink carrier frequency as a function of the comparison as described above with reference to FIGS. 2-6. In certain examples, the operations of block 1340 may be performed by the frequency estimation module 920 as described above with reference to FIG. 9.

At block 1345, the UE 115 may transmit an uplink signal with the generated uplink carrier frequency as described above with reference to FIGS. 2-6. In certain examples, the operations of block 1345 may be performed by the transmitter 715 as described above with reference to FIG. 7.

Figure 14:
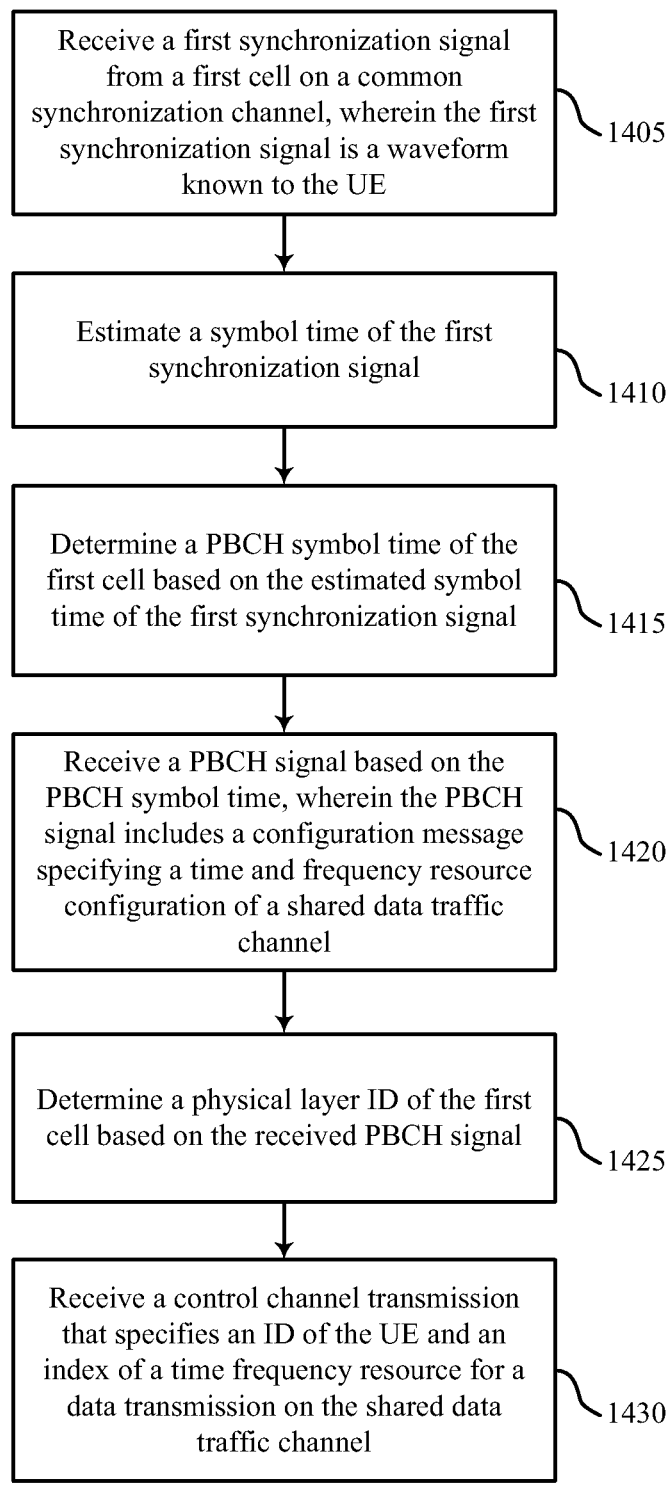
FIG. 14 shows a flowchart illustrating a method for a channel structure for a cellular IoT system in accordance with various aspects of the present disclosure.

FIG. 14 shows a flowchart illustrating a method 1400 for a channel structure for a cellular IoT system in accordance with various aspects of the present disclosure. The operations of method 1400 may be implemented by a UE 115 or its components as described with reference to FIGS. 1-10. For example, the operations of method 1400 may be performed by the communication management module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 1100, 1200, and 1300 of FIGS. 11-13.

At block 1405, the UE 115 may receive a first synchronization signal from a first cell on a common synchronization channel of the first cell, wherein the first synchronization signal is a waveform known to the UE prior to receiving the signal as described above with reference to FIGS. 2-6. In certain examples, the operations of block 1405 may be performed by the synchronization module 805 as described above with reference to FIG. 8.

At block 1410, the UE 115 may estimate a symbol time of the first synchronization signal as described above with reference to FIGS. 2-6. In certain examples, the operations of block 1410 may be performed by the synchronization module 805 as described above with reference to FIG. 8.

At block 1415, the UE 115 may determine a PBCH symbol time of the first cell based on the estimated symbol time of the first synchronization signal as described above with reference to FIGS. 2-6. In certain examples, the operations of block 1415 may be performed by the PBCH timing module 810 as described above with reference to FIG. 8.

At block 1420, the UE 115 may receive a PBCH signal based at least in part on the PBCH symbol time as described above with reference to FIGS. 2-6. The PBCH signal may comprise a configuration message specifying a time and frequency resource configuration of a shared data traffic channel for transmitting payload data traffic In certain examples, the operations of block 1420 may be performed by the PBCH timing module 810 as described above with reference to FIG. 8.

At block 1425, the UE 115 may determine a physical layer ID of the first cell based on the received PBCH signal as described above with reference to FIGS. 2-6. In certain examples, the operations of block 1425 may be performed by the cell ID module 815 as described above with reference to FIG. 8.

At block 1430, the UE 115 may receive a control channel transmission that specifies an ID of the UE and an index of a time frequency resource for a data channel transmission on the shared data traffic channel as described above with reference to FIGS. 2-6. In certain examples, the operations of block 1430 may be performed by the transmission resource module 925 as described above with reference to FIG. 9.

Figure 15:
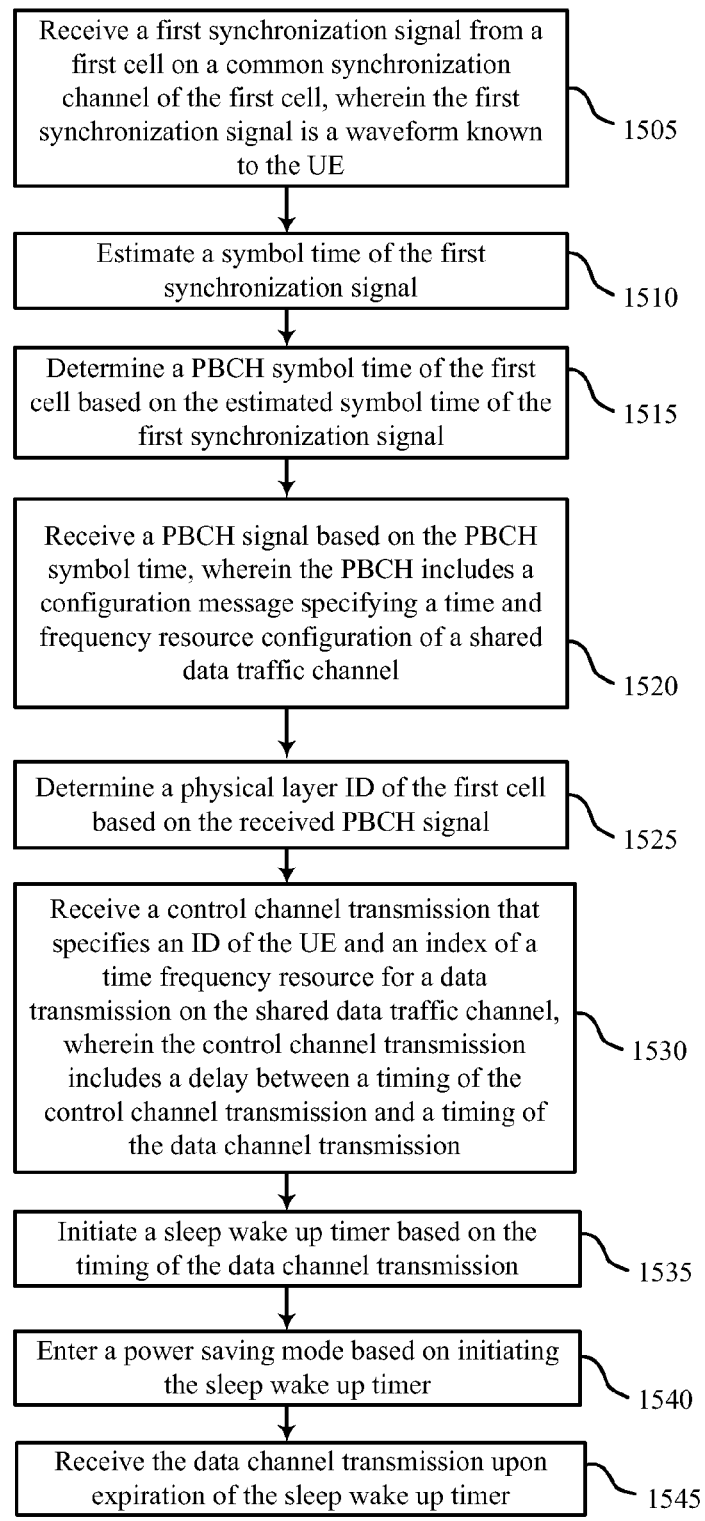
FIG. 15 shows a flowchart illustrating a method for a channel structure for a cellular IoT system in accordance with various aspects of the present disclosure.

FIG. 15 shows a flowchart illustrating a method 1500 for a channel structure for a cellular IoT system in accordance with various aspects of the present disclosure. The operations of method 1500 may be implemented by a UE 115 or its components as described with reference to FIGS. 1-10. For example, the operations of method 1500 may be performed by the communication management module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1100, 1200, 1300, and 1400 of FIGS. 11-14.

At block 1505, the UE 115 may receive a first synchronization signal from a first cell on a common synchronization channel of the first cell, wherein the first synchronization signal is a waveform known to the UE prior to receiving the signal as described above with reference to FIGS. 2-6. In certain examples, the operations of block 1505 may be performed by the synchronization module 805 as described above with reference to FIG. 8.

At block 1510, the UE 115 may estimate a symbol time of the first synchronization signal as described above with reference to FIGS. 2-6. In certain examples, the operations of block 1510 may be performed by the synchronization module 805 as described above with reference to FIG. 8.

At block 1515, the UE 115 may determine a PBCH symbol time of the first cell based on the estimated symbol time of the first synchronization signal as described above with reference to FIGS. 2-6. In certain examples, the operations of block 1515 may be performed by the PBCH timing module 810 as described above with reference to FIG. 8.

At block 1520, the UE 115 may receive a PBCH signal based at least in part on the PBCH symbol time as described above with reference to FIGS. 2-6. The PBCH signal may comprise a configuration message specifying a time and frequency resource configuration of a shared data traffic channel for transmitting payload data traffic In certain examples, the operations of block 1520 may be performed by the PBCH timing module 810 as described above with reference to FIG. 8.

At block 1525, the UE 115 may determine a physical layer ID of the first cell based on the received PBCH signal as described above with reference to FIGS. 2-6. In certain examples, the operations of block 1525 may be performed by the cell ID module 815 as described above with reference to FIG. 8.

At block 1530, the UE 115 may receive a control channel transmission that specifies an ID of the UE and an index of a time frequency resource for a data channel transmission on the shared data traffic channel as described above with reference to FIGS. 2-6. The control channel transmission may comprise a delay between a timing of the control channel transmission and a timing of the data channel transmission. In certain examples, the operations of block 1530 may be performed by the transmission resource module 925 as described above with reference to FIG. 9.

At block 1535, the UE 115 may initiate a sleep wake up timer based on the timing of the data channel transmission as described above with reference to FIGS. 2-6. In certain examples, the operations of block 1535 may be performed by the sleep wake up timer 935 as described above with reference to FIG. 9.

At block 1540, the UE 115 may enter a power saving mode based at least in part on initiating the sleep wake up timer as described above with reference to FIGS. 2-6. In certain examples, the operations of block 1540 may be performed by the power saving module 940 as described above with reference to FIG. 9.

At block 1545, the UE 115 may receive the data channel transmission upon expiration of the sleep wake up timer as described above with reference to FIGS. 2-6. In certain examples, the operations of block 1545 may be performed by the receiver 705 as described above with reference to FIG. 7.

Figure 16:
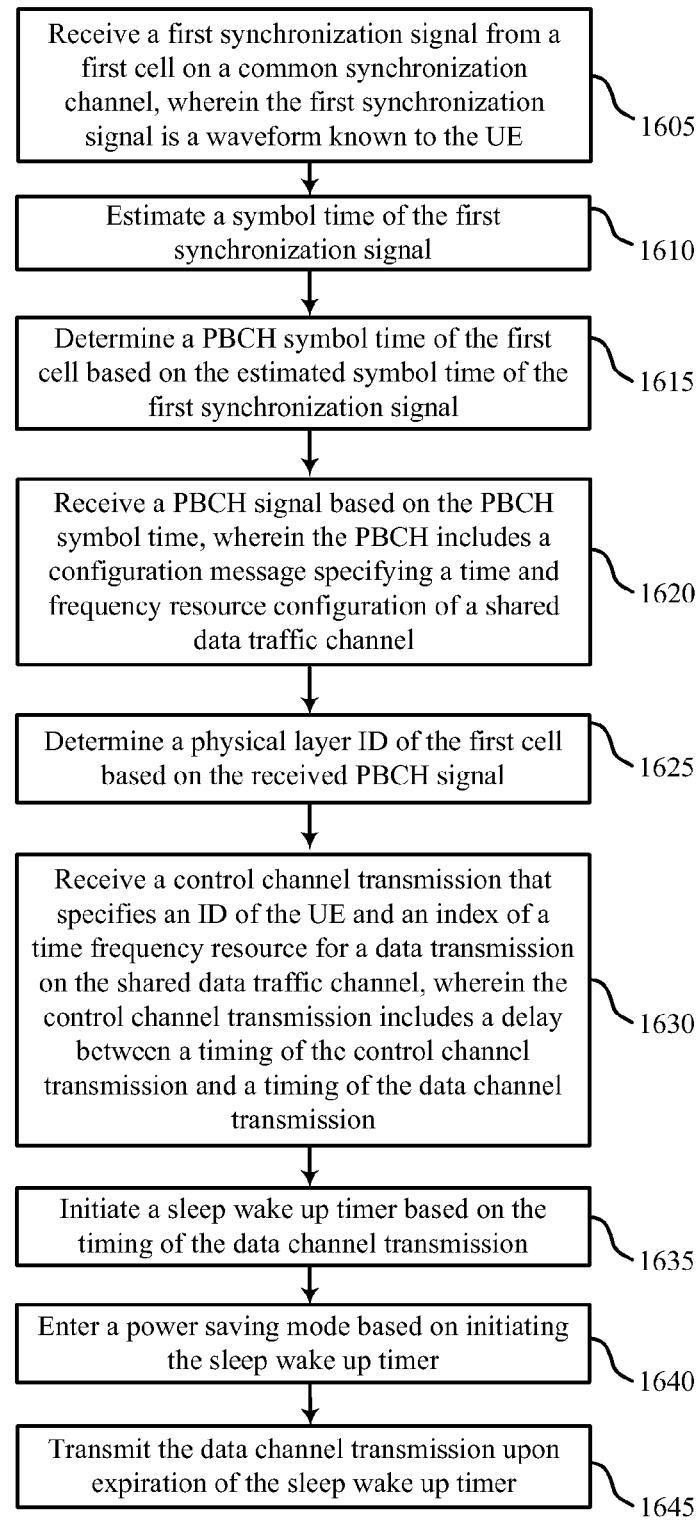
FIG. 16 shows a flowchart illustrating a method for a channel structure for a cellular IoT system in accordance with various aspects of the present disclosure.

FIG. 16 shows a flowchart illustrating a method 1600 for a channel structure for a cellular IoT system in accordance with various aspects of the present disclosure. The operations of method 1600 may be implemented by a UE 115 or its components as described with reference to FIGS. 1-10. For example, the operations of method 1600 may be performed by the communication management module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1100, 1200, 1300, 1400, and 1500 of FIGS. 11-15.

At block 1605, the UE 115 may receive a first synchronization signal from a first cell on a common synchronization channel of the first cell, wherein the first synchronization signal is a waveform known to the UE prior to receiving the signal as described above with reference to FIGS. 2-6. In certain examples, the operations of block 1605 may be performed by the synchronization module 805 as described above with reference to FIG. 8.

At block 1610, the UE 115 may estimate a symbol time of the first synchronization signal as described above with reference to FIGS. 2-6. In certain examples, the operations of block 1610 may be performed by the synchronization module 805 as described above with reference to FIG. 8.

At block 1615, the UE 115 may determine a PBCH symbol time of the first cell based on the estimated symbol time of the first synchronization signal as described above with reference to FIGS. 2-6. In certain examples, the operations of block 1615 may be performed by the PBCH timing module 810 as described above with reference to FIG. 8.

At block 1620, the UE 115 may receive a PBCH signal based at least in part on the PBCH symbol time as described above with reference to FIGS. 2-6. The PBCH signal may comprise a configuration message specifying a time and frequency resource configuration of a shared data traffic channel for transmitting payload data traffic In certain examples, the operations of block 1620 may be performed by the PBCH timing module 810 as described above with reference to FIG. 8.

At block 1625, the UE 115 may determine a physical layer ID of the first cell based on the received PBCH signal as described above with reference to FIGS. 2-6. In certain examples, the operations of block 1625 may be performed by the cell ID module 815 as described above with reference to FIG. 8.

At block 1635, the UE 115 may receive a control channel transmission that specifies an ID of the UE and an index of a time frequency resource for a data channel transmission on the shared data traffic channel as described above with reference to FIGS. 2-6. The control channel transmission may comprise a delay between a timing of the control channel transmission and a timing of the data channel transmission. In certain examples, the operations of block 1635 may be performed by the transmission resource module 925 as described above with reference to FIG. 9.

At block 1640, the UE 115 may initiate a sleep wake up timer based on the timing of the data channel transmission as described above with reference to FIGS. 2-6. In certain examples, the operations of block 1640 may be performed by the sleep wake up timer 935 as described above with reference to FIG. 9.

At block 1645, the UE 115 may enter a power saving mode based at least in part on initiating the sleep wake up timer as described above with reference to FIGS. 2-6. In certain examples, the operations of block 1645 may be performed by the power saving module 940 as described above with reference to FIG. 9.

At block 1650, the UE 115 may transmit the data channel transmission upon expiration of the sleep wake up timer as described above with reference to FIGS. 2-6. In certain examples, the operations of block 1650 may be performed by the transmitter 715 as described above with reference to FIG. 7.

Thus, methods 1100, 1200, 1300, 1400, 1500, and 1600 may provide for a channel structure for a cellular IoT system. It should be noted that methods 1100, 1200, 1300, 1400, 1500, and 1600 describe possible implementation, and that the operations and the steps may be rearranged or otherwise modified such that other embodiments are possible. In some examples, aspects from two or more of the methods 1100, 1200, 1300, 1400, 1500, and 1600 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
  receiving a first synchronization signal from a first cell on a common synchronization channel of the first cell, wherein the first synchronization signal is a waveform known to the UE prior to receiving the first synchronization signal;
  estimating a symbol time of the first synchronization signal;
  determining a physical broadcast channel (PBCH) symbol time of the first cell based on the estimated symbol time of the first synchronization signal;
  receiving a PBCH signal based at least in part on the PBCH symbol time; and
  determining a physical layer identification (ID) of the first cell based on the received PBCH signal.

2. The method of claim 1, further comprising:
  identifying a configuration message based on the PBCH signal;
  transmitting a random access signal to the first cell based on the received configuration message;
  establishing a first connection to the first cell;
  receiving a second synchronization signal from a second cell on a common synchronization channel of the second cell, the second cell being different from the first cell, wherein the first and second synchronization signals use the same waveform;
  establishing a second connection to the second cell based on the second synchronization signal; and
  exchanging data with the first cell or the second cell based on a channel structure specified by the configuration message.

3. The method of claim 2, wherein the first cell and the second cell are elements of a set of cells sharing the known waveform, wherein each cell from the set of cells has an overlapping coverage area with another cell from the set of cells.

4. The method of claim 1, further comprising:
  estimating a carrier frequency of the first synchronization signal;

comparing the estimated carrier frequency of the first synchronization signal and a local carrier frequency generated by a local oscillator of the UE;
generating an uplink carrier frequency as a function of the comparison; and
transmitting an uplink signal with the generated uplink carrier frequency.

5. The method of claim 1, wherein the PBCH signal comprises a configuration message specifying a time and frequency resource configuration of a shared data traffic channel for transmitting payload data traffic; and
the method further comprising receiving a control channel transmission that specifies an ID of the UE and an index of a time frequency resource for a data channel transmission on the shared data traffic channel.

6. The method of claim 5, further comprising:
receiving the data channel transmission on the time frequency resource of the shared data traffic channel.

7. The method of claim 5, further comprising:
transmitting the data channel transmission on the time frequency resource of the shared data traffic channel.

8. The method of claim 5, wherein a transmission power of the control channel transmission is proportional to a transmission power of the data channel transmission.

9. The method of claim 8, wherein the transmission power of the control channel transmission is based on a path loss of the UE.

10. The method of claim 5, wherein the control channel transmission comprises a delay between a timing of the control channel transmission and a timing of the data channel transmission;
the method further comprising initiating a sleep wake up timer based on the timing of the data channel transmission;
entering a power saving mode based at least in part on initiating the sleep wake up timer; and
receiving the data channel transmission upon expiration of the sleep wake up timer.

11. The method of claim 5, wherein the control channel transmission comprises a delay between a timing of the control channel transmission and a timing of the data channel transmission;
the method further comprising initiating a sleep wake up timer based on the timing of the data channel transmission;
entering a power saving mode based at least in part on initiating the sleep wake up timer; and
transmitting the data channel transmission upon expiration of the sleep wake up timer.

12. The method of claim 1, further comprising:
exchanging data using a set of channels with segments arranged according to a flexible time and frequency tiling pattern of a flexible channel structure.

13. The method of claim 12, wherein the flexible channel structure comprises a configuration of a shared channel tiling pattern based on a predetermined table and the configuration is specified by the configuration message transmitted in the PBCH signal.

14. The method of claim 13, wherein an index of a time frequency resource indicates an index of the predetermined table.

15. The method of claim 1, wherein a length of the PBCH signal is fixed and known to the UE prior to receiving the PBCH signal.

16. The method of claim 1, further comprising:
exchanging data with a network based on machine type communication (MTC) procedures.

17. An apparatus for wireless communication at a user equipment (UE), comprising:
means for receiving a first synchronization signal from a first cell on a common synchronization channel of the first cell, wherein the first synchronization signal is a waveform known to the UE prior to receiving the first synchronization signal;
means for estimating a symbol time of the first synchronization signal;
means for determining a physical broadcast channel (PBCH) symbol time of the first cell based on the estimated symbol time of the first synchronization signal;
means for receiving a PBCH signal based at least in part on the PBCH symbol time; and
means for determining a physical layer identification (ID) of the first cell based on the received PBCH signal.

18. The apparatus of claim 17, further comprising:
means for identifying a configuration message based on the PBCH signal;
means for transmitting a random access signal to the first cell based on the received configuration message;
means for establishing a first connection to the first cell;
means for receiving a second synchronization signal from a second cell on a common synchronization channel of the second cell, the second cell being different from the first cell, wherein the first and second synchronization signals use the same waveform;
means for establishing a second connection to the second cell based on the second synchronization signal; and
means for exchanging data with the first cell or the second cell based on a channel structure specified by the configuration message.

19. The apparatus of claim 18, wherein the first cell and the second cell are elements of a set of cells sharing the known waveform, wherein each cell from the set of cells has an overlapping coverage area with another cell from the set of cells.

20. The apparatus of claim 17, further comprising:
means for estimating a carrier frequency of the first synchronization signal;
means for comparing the estimated carrier frequency of the first synchronization signal and a local carrier frequency generated by a local oscillator of the UE;
means for generating an uplink carrier frequency as a function of the comparison; and
means for transmitting an uplink signal with the generated uplink carrier frequency.

21. The apparatus of claim 17, wherein the PBCH signal comprises a configuration message specifying a time and frequency resource configuration of a shared data traffic channel for transmitting payload data traffic; and
the apparatus further comprising means for receiving a control channel transmission that specifies an ID of the UE and an index of a time frequency resource for a data channel transmission on the shared data traffic channel.

22. The apparatus of claim 21, further comprising:
means for receiving the data channel transmission on the time frequency resource of the shared data traffic channel.

23. The apparatus of claim 21, further comprising:
means for transmitting the data channel transmission on the time frequency resource of the shared data traffic channel.

24. The apparatus of claim 21, wherein a transmission power of the control channel transmission is proportional to a transmission power of the data channel transmission.

25. The apparatus of claim 24, wherein the transmission power of the control channel transmission is based on a path loss of the UE.

26. The apparatus of claim 21, wherein the control channel transmission comprises a delay between a timing of the control channel transmission and a timing of the data channel transmission;
the apparatus further comprising:
means for initiating a sleep wake up timer based on the timing of the data channel transmission;
means for entering a power saving mode based at least in part on initiating the sleep wake up timer; and
means for receiving the data channel transmission upon expiration of the sleep wake up timer.

27. The apparatus of claim 21, wherein the control channel transmission comprises a delay between a timing of the control channel transmission and a timing of the data channel transmission;
the apparatus further comprising:
means for initiating a sleep wake up timer based on the timing of the data channel transmission;
means for entering a power saving mode based at least in part on initiating the sleep wake up timer; and
means for transmitting the data channel transmission upon expiration of the sleep wake up timer.

28. The apparatus of claim 17, further comprising:
means for exchanging data using a set of channels with segments arranged according to a flexible time and frequency tiling pattern of a flexible channel structure.

29. An apparatus for wireless communication at a user equipment (UE), comprising:
a processor;
memory in electronic communication with the processor; and
instructions stored in the memory; wherein the instructions are executable by the processor to:
receive a first synchronization signal from a first cell on a common synchronization channel of the first cell, wherein the first synchronization signal is a waveform known to the UE prior to receiving the first synchronization signal;
estimate a symbol time of the first synchronization signal;
determine a physical broadcast channel (PBCH) symbol time of the first cell based on the estimated symbol time of the first synchronization signal;
receive a PBCH signal based at least in part on the PBCH symbol time; and
determine a physical layer identification (ID) of the first cell based on the received PBCH signal.

30. A non-transitory computer-readable medium storing code for wireless communication at a user equipment (UE), the code comprising instructions executable to:
receive a first synchronization signal from a first cell on a common synchronization channel of the first cell, wherein the first synchronization signal is a waveform known to the UE prior to receiving the first synchronization signal;
estimate a symbol time of the first synchronization signal;
determine a physical broadcast channel (PBCH) symbol time of the first cell based on the estimated symbol time of the first synchronization signal;
receive a PBCH signal based at least in part on the PBCH symbol time; and
determine a physical layer identification (ID) of the first cell based on the received PBCH signal.

* * * * *